US010744702B2

(12) United States Patent
Kuse et al.

(10) Patent No.: US 10,744,702 B2
(45) Date of Patent: Aug. 18, 2020

(54) APPARATUS FOR FORMING CURLS

(71) Applicant: SEKISUI CHEMICAL CO., LTD., Osaka-shi, Osaka (JP)

(72) Inventors: Keita Kuse, Ritto (JP); Jun Tsuda, Ritto (JP); Akihiko Takaya, Ritto (JP); Tatsurou Baba, Ritto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 765 days.

(21) Appl. No.: 15/315,546

(22) PCT Filed: Mar. 31, 2015

(86) PCT No.: PCT/JP2015/060206
§ 371 (c)(1),
(2) Date: Dec. 1, 2016

(87) PCT Pub. No.: WO2015/186416
PCT Pub. Date: Dec. 10, 2015

(65) Prior Publication Data
US 2017/0197353 A1 Jul. 13, 2017

(30) Foreign Application Priority Data
Jun. 4, 2014 (JP) .................................. 2014-116215

(51) Int. Cl.
*B29C 53/72* (2006.01)
*B29C 63/32* (2006.01)
(Continued)

(52) U.S. Cl.
CPC .............. *B29C 53/72* (2013.01); *B29C 63/32* (2013.01); *F16L 1/00* (2013.01); *F16L 55/1655* (2013.01); *B29L 2031/003* (2013.01)

(58) Field of Classification Search
CPC ......... B29C 63/32; B29C 53/72; B29C 53/58; B29C 53/56; B29C 53/78; B29C 53/80; F16L 55/1655
See application file for complete search history.

(56) References Cited

U.S. PATENT DOCUMENTS

2010/0008731 A1* 1/2010 Kakine ................... B29C 53/72
405/184.2
2010/0184577 A1* 7/2010 Nakagaki .............. B29C 53/785
493/299
2013/0247632 A1 9/2013 Nakagaki et al.

FOREIGN PATENT DOCUMENTS

JP         10-128849 A    5/1998
JP         2006-123248 A  5/2006
(Continued)

OTHER PUBLICATIONS

International Search Report for the Application No. PCT/JP2015/060206 dated Jun. 23, 2015.

*Primary Examiner* — Anthony Calandra
*Assistant Examiner* — Elisa Vera
(74) *Attorney, Agent, or Firm* — Cheng Law Group, PLLC

(57) ABSTRACT

A curl-forming apparatus (1) includes: a main body (20) configured to deform a profile strip (100); and a support body (3) configured to support the main body (20) in a holding unit (4) for the profile strip (100). The profile strip (100) is helically wound on an inside of the holding unit (4). The main body (20) is disposed in a hollow part of the holding unit (4) and is configured to draw and deform the profile strip (100) inside the holding unit (4). The support body (3) is rotatable relative to the holding unit (4), and is configured to rotate about an axis of the holding unit (4) in synchronization with the main body (20) that draws the profile strip (100).

8 Claims, 21 Drawing Sheets

(51) Int. Cl.
  *F16L 1/00*    (2006.01)
  *F16L 55/165*  (2006.01)
  *B29L 31/00*   (2006.01)

(56) References Cited

FOREIGN PATENT DOCUMENTS

| | | | |
|---|---|---|---|
| JP | 5155756 B2 | 3/2013 | |
| JP | 2013-199097 A | 10/2013 | |
| JP | 2013-256048 A | 12/2013 | |
| WO | WO-02090227 A1 * | 11/2002 | ......... B29C 53/8016 |

* cited by examiner (a)

(b)

APPARATUS FOR FORMING CURLS

TECHNICAL FIELD

The present invention relates to an apparatus for forming curls for a reinforcing material-attached profile strip.

BACKGROUND ART

Conventionally, a rehabilitating operation of a pipe line is widely performed, the operation helically winding a long profile strip to form a rehabilitating pipe, and laying the rehabilitating pipe in a deteriorated existing pipe. Generally, the profile strip includes a plurality of ribs continuously disposed along the longitudinal direction, and in some cases, a metal reinforcing material is attached between the ribs. Since the profile strip to which the reinforcing material is attached has a high rigidity, it is suitably used for forming the rehabilitating pipe having a high self-supporting strength. This kind of profile strip is wound in a state in which the reinforcing material is attached in advance so as to be transported to a construction site.

At the time of construction, the reinforcing material-attached profile strip, which is wound on a drum for construction, is drawn. Thus, the profile strip has curls when it is being wound on the drum. Such curls of the profile strip have different curvatures depending on where the profile strip is wound, i.e., on the inner peripheral side or on the outer peripheral side of the drum. Accordingly, the curvature changes gradually as the profile strip is drawn from the drum to form the rehabilitating pipe. Thus, the profile strip may get stuck with the inner wall of the manhole at the construction site when it is introduced from the manhole. Also, when the rehabilitating pipe with a radius of curvature smaller than that of the profile strip is formed, there is another problem that it is difficult to form the rehabilitating pipe having a target pipe diameter because the diameter of the rehabilitating pipe gradually increases due to a restoring force to allow the profile strip to restore to its original radius of curvature.

In order to resolve the above conventional problems, the Applicant of the present invention has proposed an apparatus for forming curls (hereinafter referred to as a curl-forming apparatus) for deforming the profile strip before the production of the pipe so that the profile strip has a desired helical shape, as disclosed in patent Document 1.

PRIOR ART DOCUMENT

Patent Document

[Patent Document 1] Japanese Patent No. 5155756

SUMMARY OF INVENTION

Problem to be Solved by Invention

By using the conventional curl-forming apparatus, it is possible to produce reliably the rehabilitating pipe having a target pipe diameter. However, some problems described below still remain, and it is necessary to further modify the apparatus for forming a more accurate rehabilitating pipe rapidly with excellent work efficiency.

When the profile strip is continuously drawn from the drum, the profile strip is pulled in the axial direction from the inner peripheral side of the drum to the curl-forming apparatus. Since the profile strip is rigid because of a metal reinforcing material attached thereto, sometimes it is difficult to draw the profile strip smoothly to the curl-forming apparatus that is disposed in front of the drum at a certain distance. As indicated by the arrow B in FIG. 11, since the profile strip 100 helically wound is drawn from the drum in the oblique direction, a side edge of the profile strip 100 is likely to get stuck with another side edge of the adjacent turn of the profile strip 100. When the side edges of the profile strip 100 get stuck with each other, the previously drawn profile strip 100 is pulled, which prevents smooth and continuous drawing of the profile strip. In this case, it is necessary to stop the curl-forming apparatus and the winding machine temporarily so as to correct the profile strip 100 manually.

The conventional curl-forming apparatus is disposed in front of the drum in the direction in which the profile strip is drawn, which means that the angle of approach of the profile strip to the apparatus constantly changes. For this reason, an excessive load may be applied to the profile strip that passes through pinch rollers, a guide part and the like of the curl-forming apparatus. In the conventional apparatus, it is preferable to control the rotation of the ring-like frame synchronously with the rotation of the drum, which requires an operator to perform cumbersome simultaneous control of the respective rotations of the drum and the frame of the curl-forming apparatus, while observing the movement of the profile strip.

The present invention was made in consideration of the above circumstances. An object of the present invention is to provide a curl-forming apparatus that can smoothly draw and desirably deform the profile strip without applying load, and that can introduce the profile strip continuously and stably to the winding machine without stopping the curl-forming apparatus and the winding machine to manually correct the profile strip, which results in higher work efficiency and reduction in the time required for the rehabilitating operation.

Means for Solving Problem

As solving means to achieve the above object, the present invention is directed to a curl-forming apparatus configured to deform a profile strip for rehabilitating a pipe line so that the profile strip has helical curls. The curl-forming apparatus includes: a main body configured to deform the profile strip; and a support body configured to support the main body in a holding unit for the profile strip. The profile strip, which includes a reinforcing material in a longitudinal direction thereof, is helically wound on an inside of the holding unit so as to form a hollow part in an axial direction of the holding unit. The main body is disposed in the hollow part and is configured to draw and deform the profile strip inside the holding unit. The support body is rotatably attached to the holding unit, and is configured to rotate about an axis thereof in synchronization with the main body that draws the profile strip.

With the above-described configuration, when using the curl-forming apparatus, it is possible to install the curl-forming apparatus in the holding unit for the profile strip. Thus, even when the profile strip includes the reinforcing material and is rigid, it is possible to smoothly draw the profile strip into the main body so as to deform. Since the support body rotates about its axis, the main body also rotates in the hollow part and draws the profile strip. Therefore, it is possible to deform the profile strip so that it has helical curls while preventing the profile strip from being affected by an excessive force or from being twisted.

It is preferable that the main body is supported in the hollow part so as to be displaceable in the axial direction, and that a position at which the profile strip is drawn into the main body is moved in the axial direction.

With the above-described configuration, the main body can displace in the axial direction so as to draw the profile strip at an appropriate position according to release of the profile strip from the inside of the holding unit.

It is further preferable that, the main body includes: a drive unit configured to draw the profile strip from the inside of the holding unit so as to discharge the profile strip; and a deforming roller configured to transfer the profile strip discharged from the drive unit while pressing the profile strip toward an inside in a radial direction of the deforming roller so as to form curls in the profile strip.

With the above-described configuration, it is possible to continuously form helical curls in the profile strip via the drive unit and the deforming roller, accordingly, the entire apparatus can be downsized.

Effects of Invention

With the above-described configuration of the present invention, it is possible to deform the profile strip to have helical curls without applying an excessive force. Thus, it is possible to remarkably improve work efficiency in the rehabilitating operation and to reduce working hours.

BRIEF DESCRIPTION OF DRAWINGS

FIG. 23(a) is a cross-sectional view thereof, and FIG. 23(b) is an enlarged perspective view illustrating a joining end portion by a connector.

MODES FOR CARRYING OUT INVENTION

Figure 1:
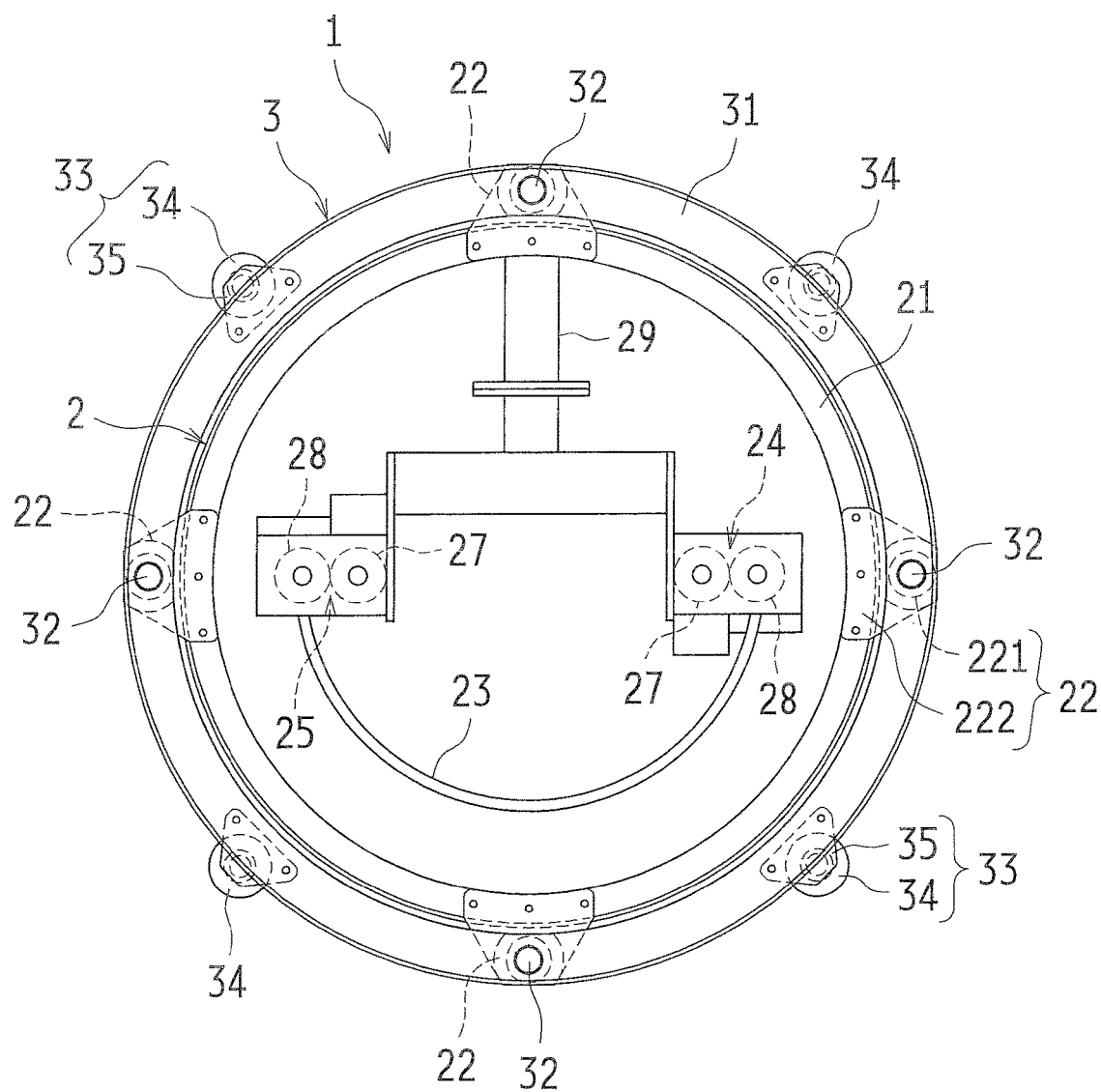
FIG. 1 is a front view of a curl-forming apparatus according to Embodiment 1 of the present invention.

Hereinafter, a curl-forming apparatus according to embodiments of the present invention will be described with reference to the drawings.

Embodiment 1

A curl-forming apparatus 1 is used for forming helical curls in a profile strip 100 inside a holding unit 4 when rehabilitating an existing pipe 6. The profile strip 100 is housed in the holding unit 4 with being helically wound. It is necessary to form helical curls in the profile strip 100 to which a reinforcing material 120 is attached so as to enhance rigidity. The helical curls are formed prior to producing a rehabilitating pipe 130.

Before description of the curl-forming apparatus 1 of the embodiments, a general configuration of the profile strip 100 to be deformed and the holding unit 4 to hold the profile strip 100 will be described.

(Profile Strip)

Figure 8:
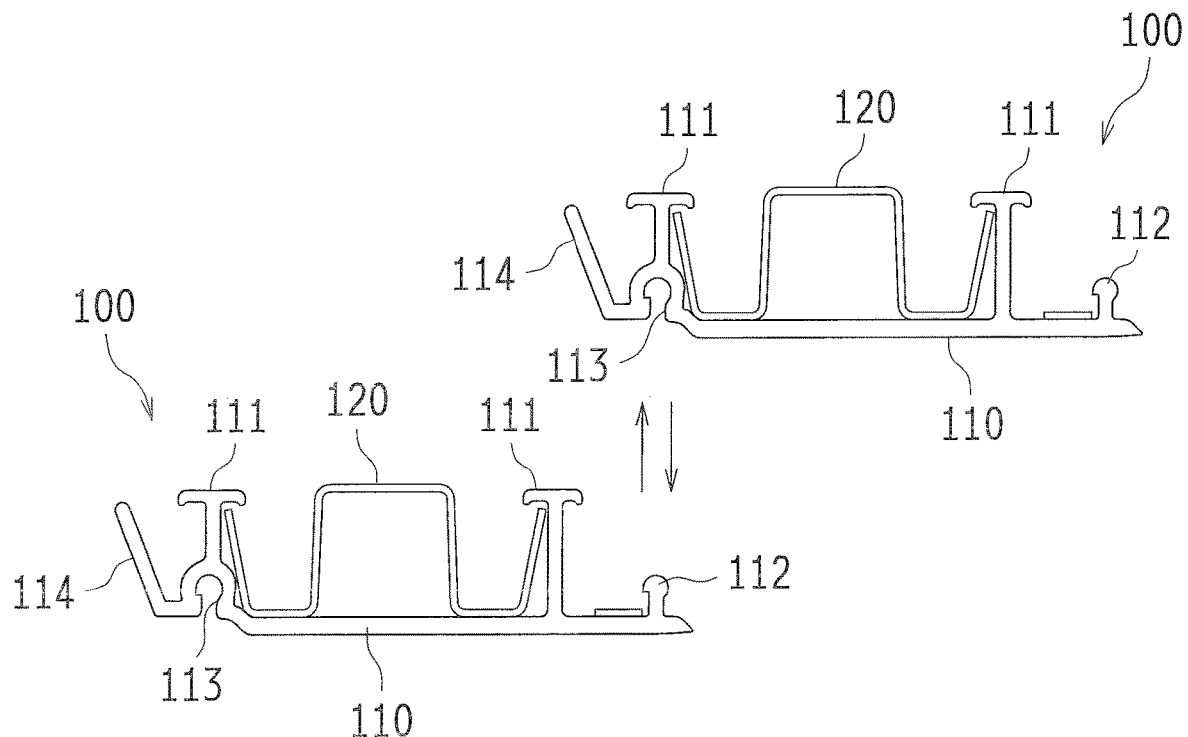
FIG. 8 is a cross-sectional view illustrating one example of a reinforcing material-attached profile strip.
Figure 9:
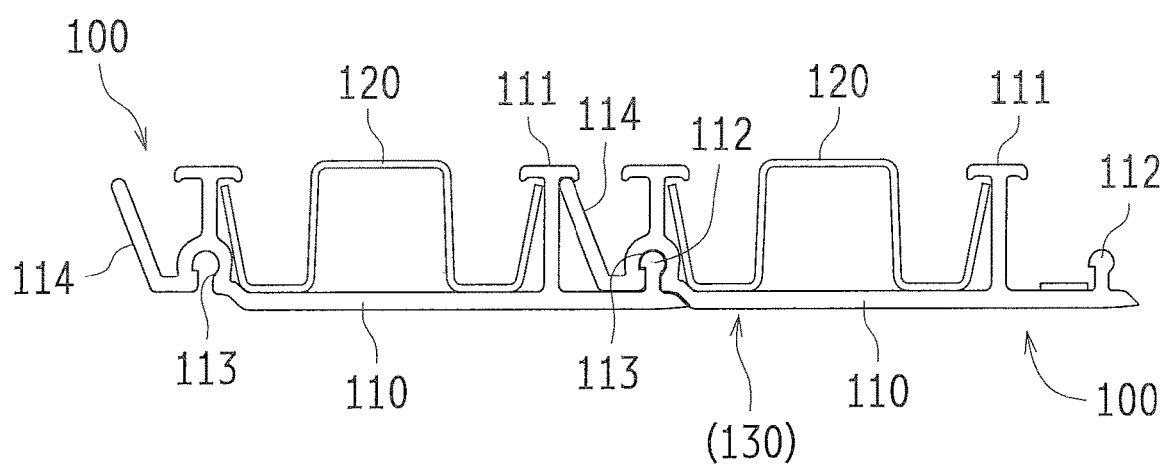
FIG. 9 is a cross-sectional view illustrating a joined state of the profile strip.

As shown in FIGS. 8 and 9, the profile strip 100, which is an elongated material, includes a profile strip body 110 and the reinforcing material 120. The profile strip body 110 is formed by subjecting a flexible synthetic resin material such as hard vinyl chloride, polyethylene, polypropylene, or the like to extrusion molding. The profile strip body 110 includes ribs 111 each having a T-shaped cross-section. Note that, in FIGS. 8 and 9, the hatching showing the cross-section of the profile strip 100 is omitted for the purpose of clarity of the drawings.

A joint convex part 112 is disposed on one side edge of the profile strip body 110. On the other side edge are disposed a joint concave part 113 to which the joint convex part 112 is fitted, and an inclined piece 114 to be fitted to an adjacent rib 111. The joint concave part 113 is formed integrally with the rib 111 having substantially the T-shaped cross-section that is disposed on the side opposite to the joint concave part 113.

The reinforcing material 120 is made of a strip plate-like steel sheet, and attached between the ribs 111 of the profile strip body 110. The reinforcing material 120 has a cross-section that includes: a center part in the width direction that is bent so as to protrude in a convex shape; and both side edges in the width direction that are bent diagonally upward so as to be locked to the ribs 111. The profile strip body 110, to which the reinforcing material 120 is attached in advance, is wound on the drum and the like or wound substantially in a cylinder shape so as to be banded. Thus, the profile strip 100 is transported to the construction site.

The profile strip 100 is supplied to a winding machine 5 with the surface on which the ribs 111 are protruded being the outer peripheral side. In this process, the profile strip 100 is spirally fed, and as shown in FIG. 8, a previously fed part and a subsequently fed part of the profile strip 100 are adjacent to each other so as to be joined by fitting the joint convex part 112 to the joint concave part 113. Furthermore, as shown in FIG. 9, the inclined piece 114 is locked to the rib 111 of the adjacent profile strip 100. Thus, the spiral profile strip 100 is made as a pipe continued in its axial direction, accordingly, the rehabilitating pipe 130 is formed.

(Holding Unit)

Figure 10:
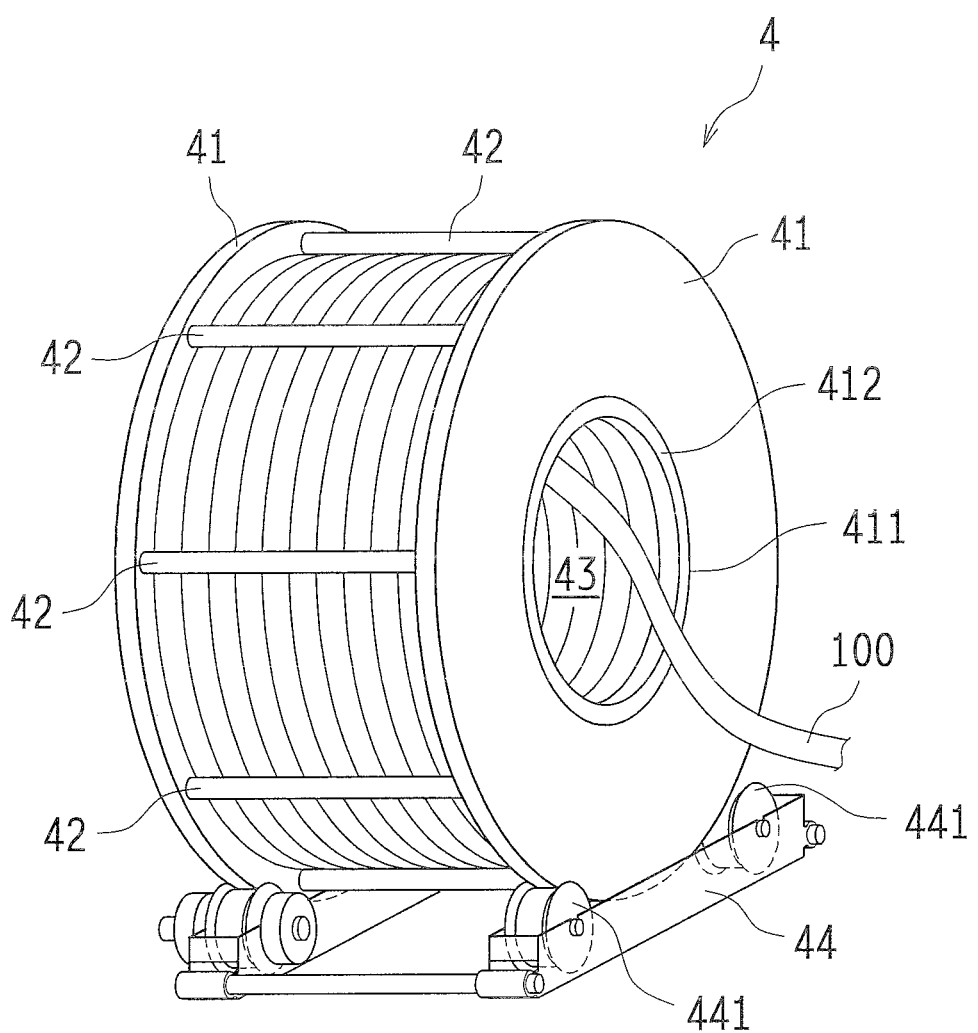
FIG. 10 is a perspective view illustrating one example of the holding unit.

As shown in FIG. 10, the holding unit 4 holds the long profile strip 100, and can discharge the profile strip 100 while rotating.

The holding unit 4 includes: a pair of flange frames (rotary frames) 41 each having a circular opening 411 in their center parts; and coupling members 42 that are bridged between the flange frames 41 to integrally support the pair of flange frames 41. The coupling members 42 are made of, for example, a plurality of rod-like members or long-plate-like members, which are disposed in the vicinity of the outer periphery of the flange frame 41 at constant intervals. Between the flange frames 41, the profile strip 100 is helically wound, many times, on the holding unit 4. The holding unit 4 has a hollow part 43 formed in the center part thereof in the axial direction.

The profile strip 100 is being helically wound on a core member (not shown) as the center. After the profile strip 100 is housed in the holding unit 4, the core member is removed, thus the outer peripheral side of the profile strip 100 is held by the coupling members 42. In the center part of the holding unit 4, the hollow part 43, which is a hollow after removing the core member, is formed in a substantially cylinder shape in the axial direction.

Figure 4:
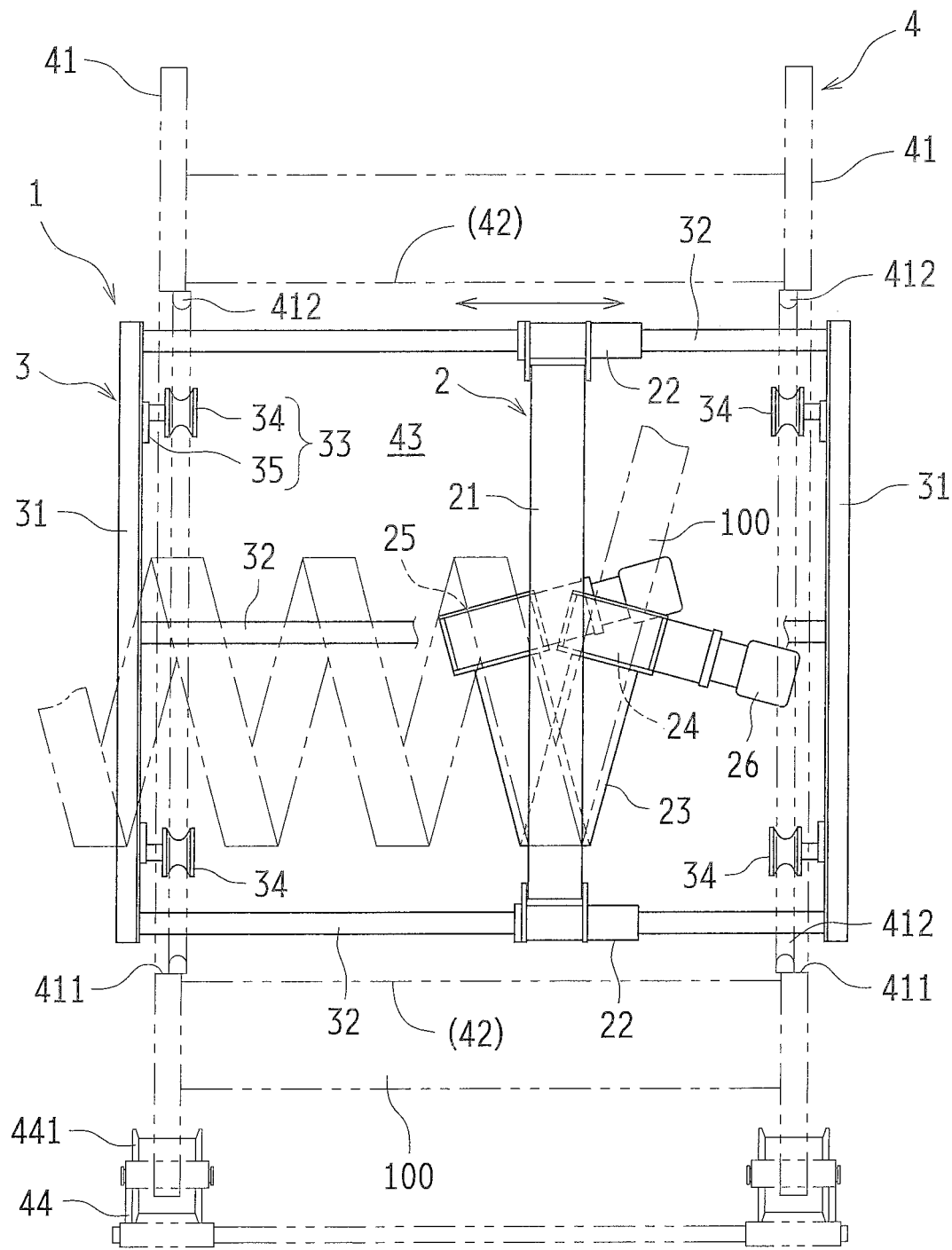
FIG. 4 is a side view of FIG. 3.

Along the inner peripheral edge of the circular opening 411 of the flange frame 41, a ring-shaped rail body 412 is provided integrally with the flange frame 41 (see FIG. 4). At least an inner peripheral side of the rail body 412 has an external form with a circular-arc shaped cross section. The holding unit 4 is rotatably placed on a base 44 having rotatable rollers 441.

(Curl-Forming Apparatus)

As shown in FIGS. 1 to 5, the curl-forming apparatus 1 includes: a main body 2 having a curl-forming unit; and a support body 3 supporting the main body 2 in the holding unit 4.

Figure 2:
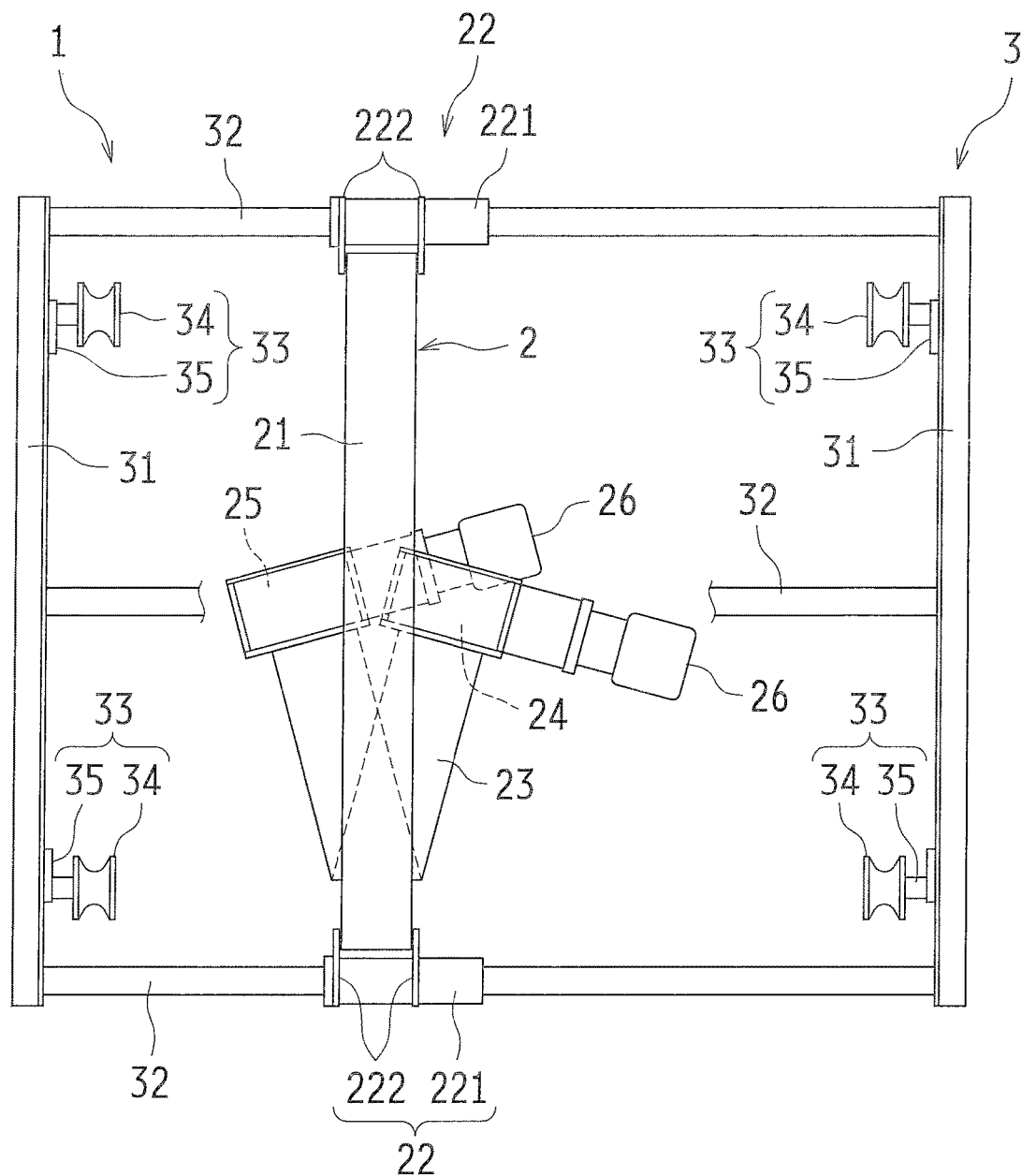
FIG. 2 is a side view of the curl-forming apparatus according to Embodiment 1 of the present invention.

The support body 3 is attached to the holding unit 4 so as to displaceably support the main body 2 in the hollow part 43 of the holding unit 4 in the axial direction. As shown in FIG. 2, the support body 3 includes: a pair of support frames 31; a plurality of guide bars 32 extending parallel to each other in the axial direction; and bearing units 33 for engaging with the holding unit 4.

The support frame 31 is a ring-shaped frame body and has an outer diameter smaller than the inner diameter of the hollow part 43 of the holding unit 4. The pair of support frames 31 is disposed in the holding unit 4 at the front and rear ends thereof in the axial direction.

The guide bars 32 are bridged between the front and rear support frames 31 so as to be disposed in the axial direction. In the aspect exemplarily shown, four guide bars 32 are disposed between the support frames 31 at constant intervals in the circumferential direction.

The bearing units 33 are disposed at constant intervals in the circumferential direction on each of the front and rear support frames 31. In the example shown in FIGS. 1 and 2, the bearing unit 33 includes: a roller (support roller) 34 for engaging with the inner peripheral edge of the circular opening 411 of the flange frame 41 of the holding unit 4; and a bracket 35 for mounting the roller 34 on the support frame 31. The four rollers 34 are each rotatably supported by an inner surface of the support frame 31 via the corresponding bracket 35. Each roller 34 includes a concave-shaped groove in the outer peripheral surface thereof so as to be rotatably engaged with the rail body 412 of the flange frame 41 of the holding unit 4.

Figure 3:
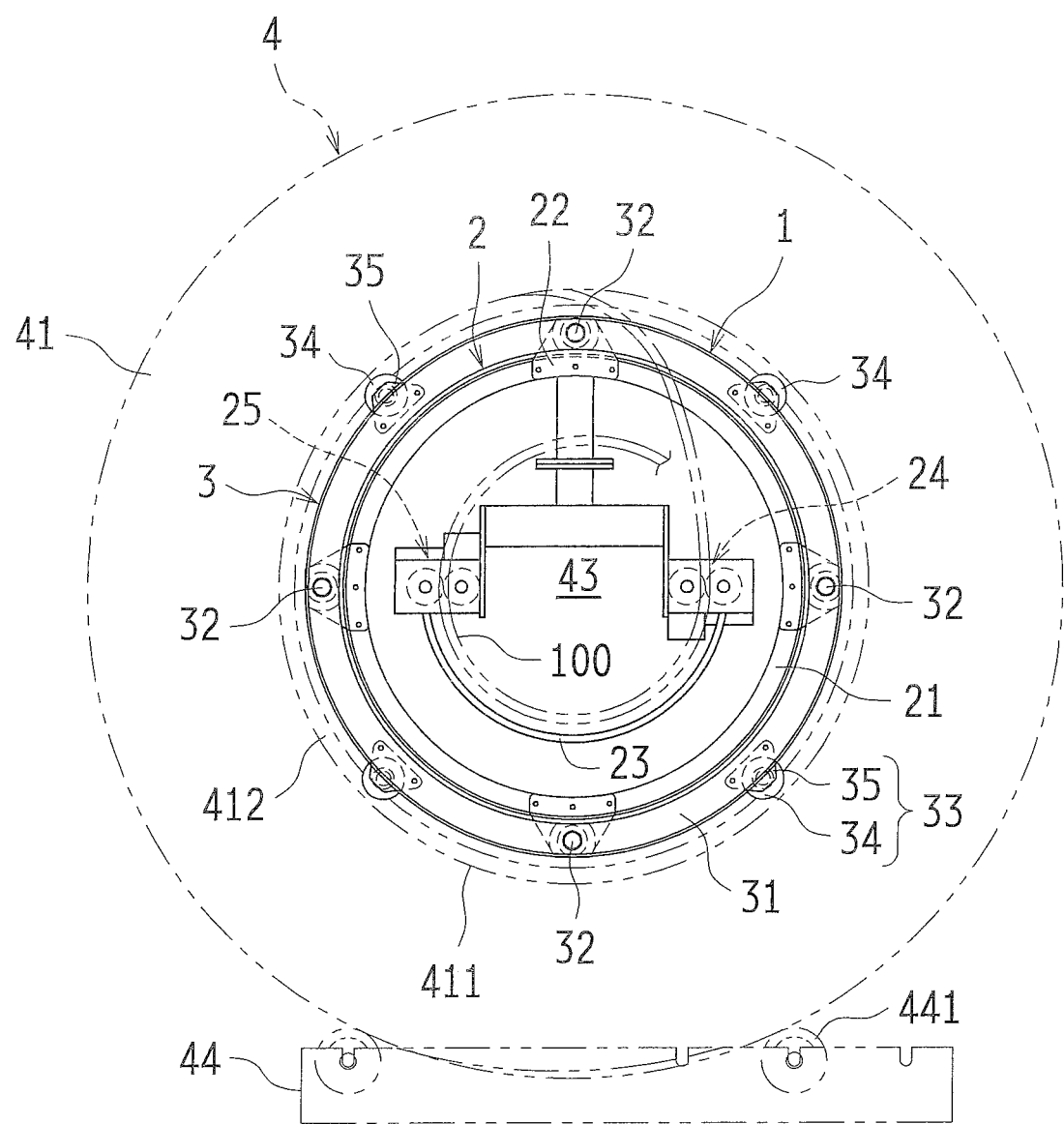
FIG. 3 is a front view illustrating the curl-forming apparatus and a holding unit.

As shown in FIGS. 3 and 4, the support body 3 is installed in the holding unit 4 and supported by the rollers 34, thereby capable of rotating about the axis of the holding unit 4. The support body 3 is attachable to/detachable from the holding unit 4 by engaging/disengaging the rollers 34 with/from the flange frame 41.

The main body 2 of the curl-forming apparatus 1 includes: a ring-shaped main body frame 21; main body holding parts 22 disposed on the main body frame 21; and the curl-forming unit provided inside the main body frame 21.

As shown in FIG. 1, the ring-shaped main body frame 21 has an outer diameter smaller than the inner diameter of the support frame 31. The main body frame 21 includes a plurality of main body holding parts 22. The respective main body holding parts 22 are disposed on four positions of the main body frame 21 at constant intervals so as to protrude toward the outer peripheral direction.

In the aspect exemplarily shown, the main body holding part 22 includes: a sliding part 221 through which the guide bar 32 passes so that the guide bar 32 is slidably held; and a support plate 222 that supports the sliding part 221 relative to the main body frame 21. The support plate 222 is fixed on both front and rear side surfaces of the main body frame 21 so as to sandwich the main body frame 21, and protrudes toward the outer peripheral direction of the main body frame 21. Thus, the main body holding part 22 is engaged with the guide bar 32, and thereby capable of displacing along the guide bar 32.

Figure 5:
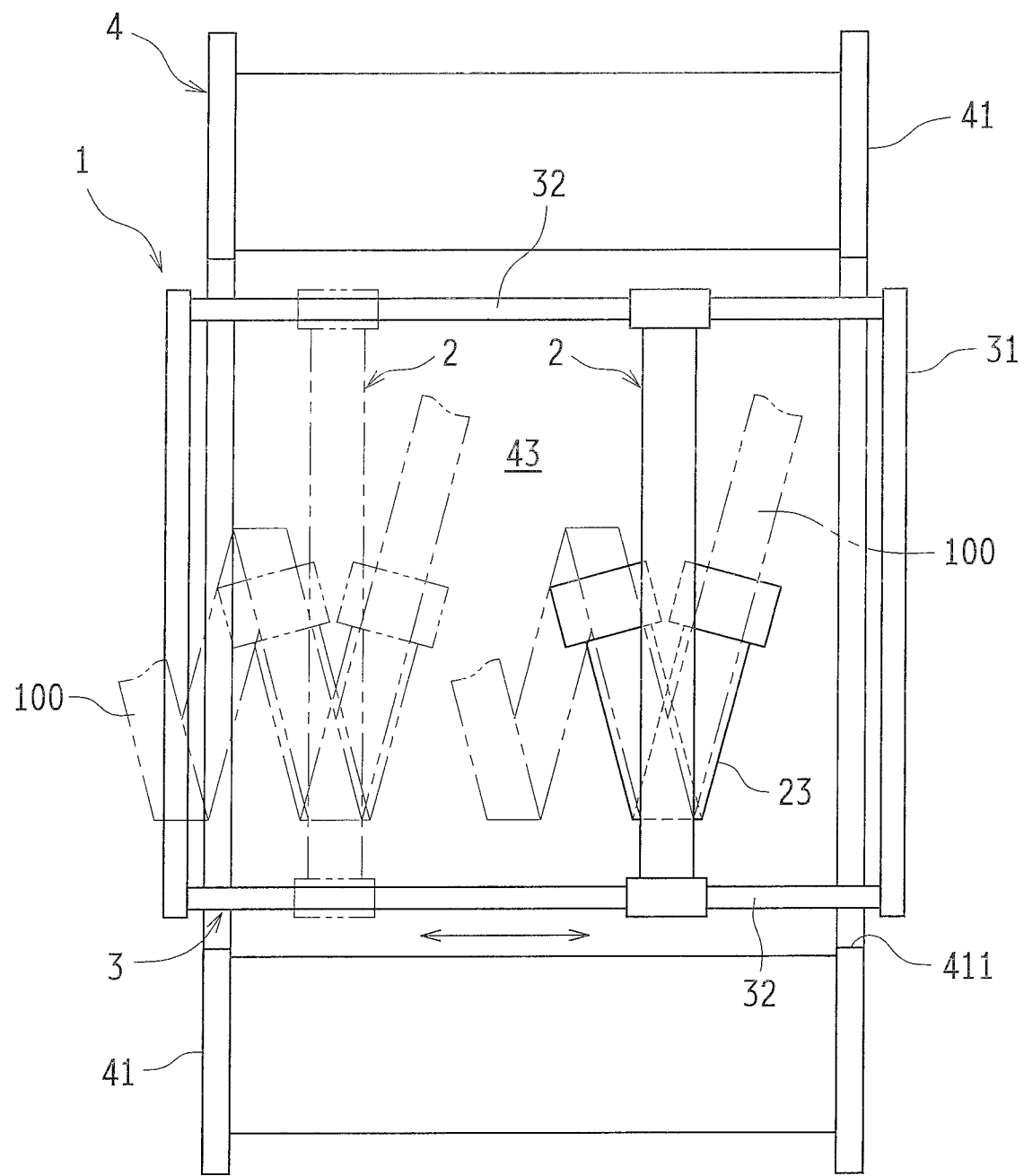
FIG. 5 is an explanation diagram illustrating movement of a main body in the curl-forming apparatus.

Thus, as shown in FIG. 5, the main body 2 is installed inside the holding unit 4. The main body 2 is displaceably supported by the plurality of guide bars 32 in the axial direction of the holding unit 4, and can reciprocate inside the hollow part 43 of the holding unit 4.

The curl-forming unit included in the main body 2 can be configured in many manners. As one example of the curl-forming unit, the configuration shown in FIGS. 1 and 2 includes: a guide part 23 that helically guides the profile strip 100; a first pinch roller 24 disposed upstream of the guide part 23; and a second pinch roller 25 disposed downstream of the guide part 23. The above components are integrally provided on the main body frame 21 via an attachment bracket 29.

The guide part 23 is made of a strip plate material having the radius of curvature substantially similar to that of the outer diameter of the rehabilitating pipe 130 to be produced using the profile strip 100. The inner surface of the guide part 23 has a substantially semicircular shape modeled on the shape of a part of the spirality. The profile strip 100 is placed along the inner surface of the guide part 23 and curled so as to have the radius of curvature corresponding to the radius of curvature of the guide part 23. The reinforcing material 120 of the profile strip 100 is deformed so as to have the radius of curvature substantially corresponding to the radius of curvature of the rehabilitating pipe 130 to be produced.

On the inner surface side of the guide part 23, appropriate guide members are preferably provided, such as a plurality of rotary rollers and an insert path having a rectangular cross-section for the profile strip 100, so that the profile strip 100 is prevented from dropping off. The guide part 23 may have the radius of curvature not more than that of the inner diameter of the rehabilitating pipe 130 to be produced.

The pinch rollers 24 and 25, which are respectively disposed upstream/downstream of the guide part 23, each have an inner roller 27 and an outer roller 28. The pinch rollers 24 and 25 sandwich the profile strip 100 from its inner surface side and its outer surface side and rotate. The inner roller 27 is disposed on the inner surface side of the guide part 23 and formed in a cylinder shape. The outer roller 28, which is disposed on the outer surface side of the guide part 23, has a peripheral groove or a flange part so as to fit to the rib 111 and the reinforcing material 120 of the profile strip 100 and to rotate.

At least one of the first pinch roller 24 and the second pinch roller 25 has a drive motor 26. In the aspect exemplarily shown in FIG. 2, both the first pinch roller 24 and the second pinch roller 25 have respectively the drive motors 26. The inner roller 27 and the outer roller 28 are rotated in opposite directions to each other by the drive motor 26, thereby sandwiching the profile strip 100 to which is attached the reinforcing material 120. Thus, the reinforcing material-attached profile strip 100 is drawn into the guide part 23 and is discharged from the guide part 23.

When the drive motor 26 is provided only on the first pinch roller 24, the drive motor 26 pulls the profile strip 100 into the upstream side of the guide part 23, and transfers the profile strip 100 to the downstream side using its drive force. When the drive motor 26 is provided only on the second pinch roller 25, the drive motor 26 sandwiches and discharges the profile strip 100 downstream of the guide part 23, and pulls the upstream profile strip 100 using its drive force. It is possible to draw/discharge the profile strip 100 more stably by providing the drive motor 26 on each of the upstream side and downstream side.

Note that any other configuration may be adopted as the curl-forming unit, provided that it includes: the guide part 23 along which the profile strip 100 is helically placed; and at least one of a transfer unit disposed upstream of the guide part 23 so as to draw the profile strip 100 into the guide part 23 and a transfer unit disposed downstream of the guide part 23 so as to discharge the profile strip 100 from the guide part. The number of the guide bars 32 of the support body 3 is not limited to four. It may be not more than three or not less than five.

(Method for Rehabilitating Existing Pipe)

Next, a method for rehabilitating the existing pipe 6 using the above-described curl-forming apparatus 1 will be described.

Figure 6:
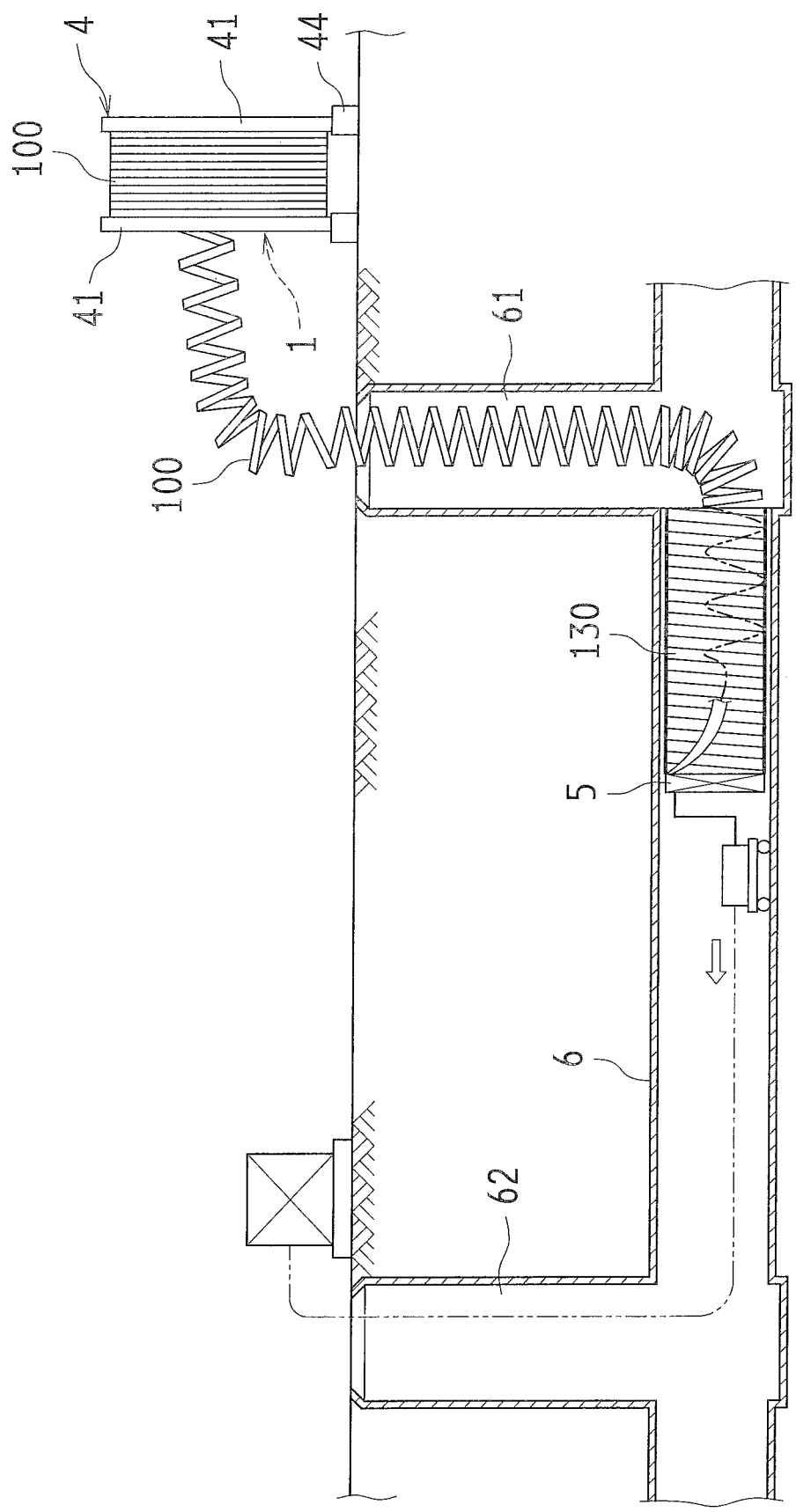
FIG. 6 is an explanation diagram illustrating a method for rehabilitating an existing pipe using the curl-forming apparatus.

As shown in FIG. 6, the rehabilitating operation of the existing pipe 6 is performed from a departure side manhole 61 on the upstream side toward an arrival side manhole 62 on the downstream side. The holding unit 4 holding the profile strip 100 is disposed on the ground in the vicinity of the departure side manhole 61. The holding unit 4 is rotatably placed on the base 44 having rotary rollers.

The winding machine 5 is disposed in the existing pipe 6 through the departure side manhole 61. The winding machine 5 rotates inside the existing pipe 6 to helically wind the profile strip 100, and travels toward the downstream side in the existing pipe 6 while sequentially joining the joint concave part 113 and the joint convex part 112 adjacent to each other to form the rehabilitating pipe 130.

The curl-forming apparatus 1 is used with being installed in the holding unit 4 on the ground. As shown in FIGS. 3 and 4, the support body 3 of the curl-forming apparatus 1 is attached to the holding unit 4, thus the main body 2 is disposed inside the hollow part 43 of the holding unit 4. Regarding the support body 3, four rollers 34 are engaged with the rail body 412 of the flange frame 41 of the holding unit 4 so as to be attached to the flange frame 41. Like this, the support body 3 is rotatably supported by the rollers 34 in the axial direction of holding unit 4 along the circular opening 411 of the holding unit 4. The main body 2 supported by the support body 3 is also rotatable inside the hollow part 43 of the holding unit 4.

The profile strip 100 is drawn from the inner peripheral side of the holding unit 4 so as to pass through the first pinch roller 24, the guide part 23 and the second pinch roller 25 of the curl-forming apparatus 1. These pinch rollers 24 and 25 are rotary driven by driving the drive motor 26, thus the profile strip 100 is drawn and discharged along the guide part 23. The following profile strip 100 is sequentially drawn into the main body 2 of the curl-forming apparatus 1 inside the hollow part 43 of the holding unit 4.

When the profile strip 100 is released from the inner peripheral side of the holding unit 4, the profile strip 100 is sequentially released with its release position reciprocally displacing in the axial direction of the hollow part 43 of the holding unit 4. Meanwhile, the main body 2 including the curl-forming unit is disposed inside the hollow part 43 of the holding unit 4 and displaceably supported in the axial direction. For this reason, as shown in FIG. 5, the main body 2 displaces in the axial direction along the guide bars 32, and draws the profile strip 100 at the appropriate position according to release of the profile strip 100 from the inner peripheral side of the holding unit 4. Since no excessive force is applied to the profile strip 100, the profile strip 100 can be smoothly guided to the main body 2.

Figure 11:
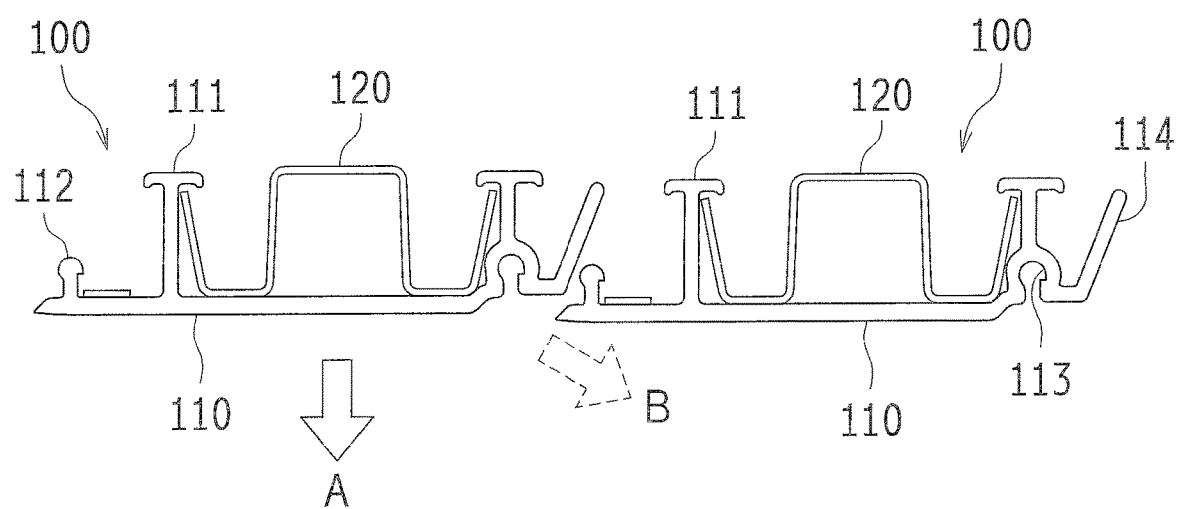
FIG. 11 is an explanation diagram illustrating the reinforcing material-attached profile strip.

Conventionally, when the profile strip 100 is released from the inner peripheral side of the holding unit 4, the profile strip 100 is drawn in the oblique direction indicated by the arrow B as shown in FIG. 11. Thus, the side edge of the profile strip 100 is likely to get stuck with an adjacent turn of the profile strip 100. In contrast, in the curl-forming apparatus 1 according to this embodiment, the main body 2 displaces in the axial direction in the holding unit 4 to draw the profile strip 100. As a result, the profile strip 100 is drawn in the direction indicated by the allow A in FIG. 11, which means that the parts of the profile strip 100 are scarcely caught by each other. Thus, it is possible to continuously draw the profile strip 100 smoothly from the inner peripheral side of the holding unit 4 and to introduce the profile strip 100 into the guide part 23 of the main body 2, which results in stable formation of the helical curls.

As shown in FIG. 5, the main body 2 is reciprocating in the axial direction inside the hollow part 43 of the holding unit 4 when it draws the profile strip 100. Following the position of the profile strip 100 held in the holding unit 4, the main body 2 moves in the axial direction along the guide bars 32. Furthermore, when the release position of the profile strip 100 is reciprocated in the axial direction, the main body 2 also reciprocates in the axial direction in response to the movement of the profile strip 100 so as to draw the profile strip 100. Thus, the profile strip 100 can continuously be drawn into the main body 2.

The profile strip 100 that enters the main body 2 is helically guided along the guide part 23 and discharged from the second pinch roller 25. Thus, the profile strip 100 having helical curls is introduced from the holding unit 4 to the departure side manhole 61. Then, as shown in FIG. 6, the profile strip 100 that keeps the helical curls passes through the departure side manhole 61 so as to be supplied to the winding machine 5 in the existing pipe 6.

The support body 3 of the curl-forming apparatus 1 rotates in the direction opposite to the direction in which the profile strip 100 is discharged due to a reaction force generated when the main body 2 draws and discharges the profile strip 100. Since the support body 3 is rotatably supported by the flange frame 41 of the holding unit 4 via the rollers 34, it rotates freely about the axis of the holding unit 4 in synchronization with the discharge of the profile strip 100. The main body 2 in the holding unit 4, which is supported by the support body 3, also rotates about the axis together with the support body 3.

For this reason, a relative excess or deficiency in the amount of the profile strip 100 discharged from the curl-forming apparatus 1 does not occur relative to formation of the rehabilitating pipe 130 by the winding machine 5 rotating in the existing pipe 6. Thus, the profile strip 100 can be very smoothly supplied without being twisted. In contrast to the conventional art, it is not necessary for an operator to control the rotation of the holding unit and the rotation of the curl-forming apparatus so that they are synchronized with each other. Also, it is possible to form curls in the profile strip 100 as it is released from the holding unit 4 without applying any excessive force, and to stably discharge the profile strip 100 having a desired spirality.

Figure 7:
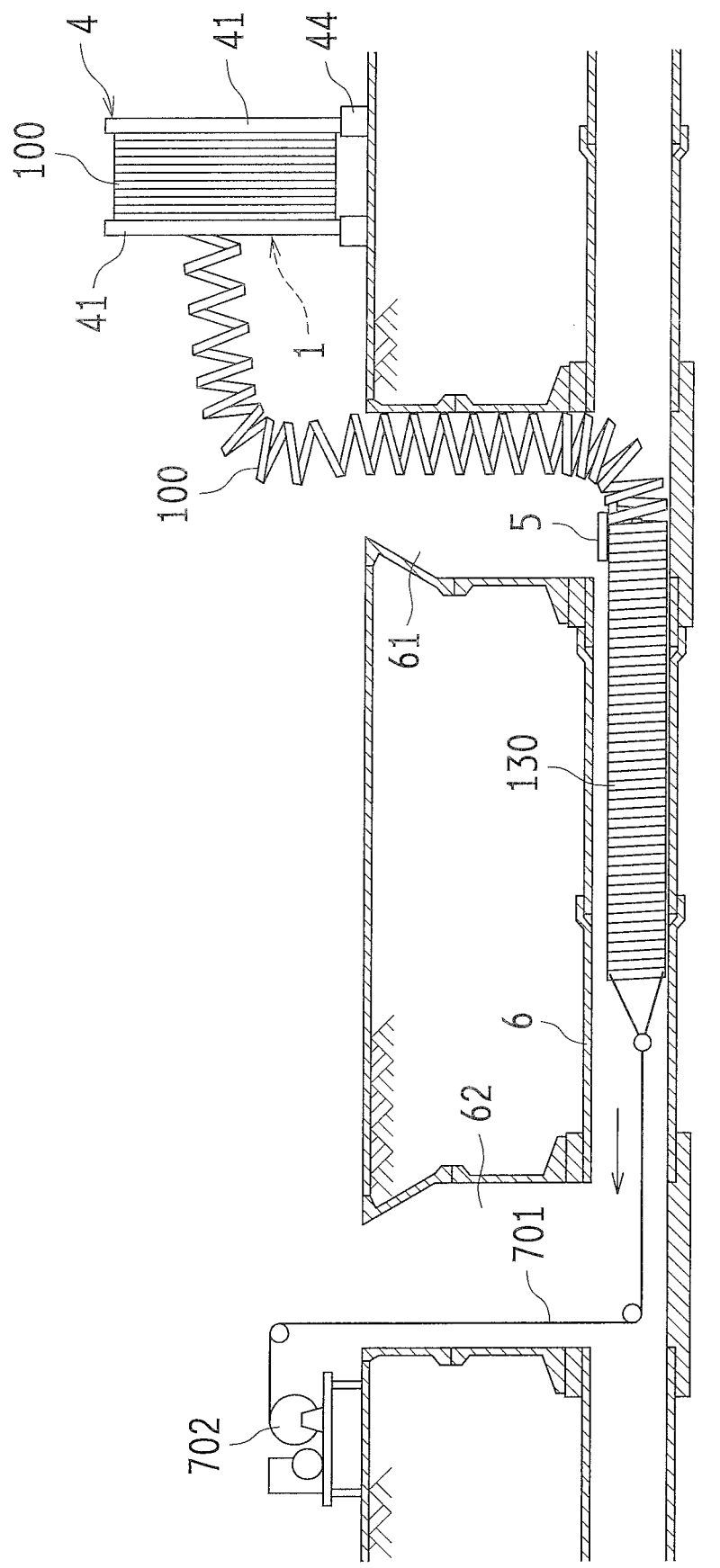
FIG. 7 is an explanation diagram illustrating another method for rehabilitating the existing pipe using the curl-forming apparatus.

As shown in FIG. 7, the curl-forming apparatus 1 can also be suitably used in a method for rehabilitating the existing pipe 6 in which the winding machine 5 is placed on the bottom of the departure side manhole 61. In this case, a cable 701 is connected to the head of the rehabilitating pipe 130 formed by the winding machine 5. The cable 701 is reeled, by driving a traction tool 702 such as a winch disposed on the ground, according to the speed of forming the rehabilitating pipe 130. In this way, the rehabilitating pipe 130 is towed to the downstream side via the arrival side manhole 62. In the holding unit 4 on the ground, the curl-forming apparatus 1 is installed as described above. Thus, it is possible to supply the profile strip 100 to the winding machine 5 while stably forming desired curls in the profile strip 100. With this configuration, even when the existing pipe 6 has a bore too small to place the winding machine 5 inside the existing pipe 6, it is possible to form accurately the rehabilitating pipe 130 using the profile strip 100 to which is attached the reinforcing material 120, thereby rehabilitating the pipe line.

When the holding unit 4 is replaced with a new one during the rehabilitating operation of the existing pipe 6, it is possible to remove the curl-forming apparatus 1 from the holding unit 4, and then to install the curl-forming apparatus 1 in a holding unit 4 that holds a new profile strip 100. When the rehabilitating operation is completed, it is possible to remove the curl-forming apparatus 1 from the holding unit 4, thereby separating the curl-forming apparatus 1 from the holding unit 4.

As described above, with the curl-forming apparatus 1 according to the present invention, the main body 2 reciprocates in the axial direction according to the release of the profile strip 100 from the inner peripheral side of the holding unit 4 so as to draw the profile strip 100. Thus, it is possible to continuously and stably form curls in the profile strip 100 without applying no excessive force by preventing the adjacent turns of the profile strip 100 from getting stuck with each other.

Thus, it is not necessary to stop the winding machine 5 and the like during the rehabilitating operation so as to manually correct the profile strip 100 released from the holding unit 4, which results in an efficient operation. In the curl-forming apparatus 1, since the main body 2 rotates freely about the axis in the holding unit 4, no separate control unit is needed to rotate synchronously the holding unit 4 and the curl-forming apparatus 1. Thus, it is possible to supply the profile strip 100 to the winding machine 5 in just proportion, which means that an accurate rehabilitating pipe 130 can be formed with a reduced number of operators and that the operating time can also be reduced. As the curl-forming apparatus 1 is integrally disposed with the holding unit 4 on the ground on the side of the departure side manhole 61, it is sufficient to ensure the installation space for the holding unit 4 in order to form curls, which results in the operation in a reduced space.

Embodiment 2

Figure 14:
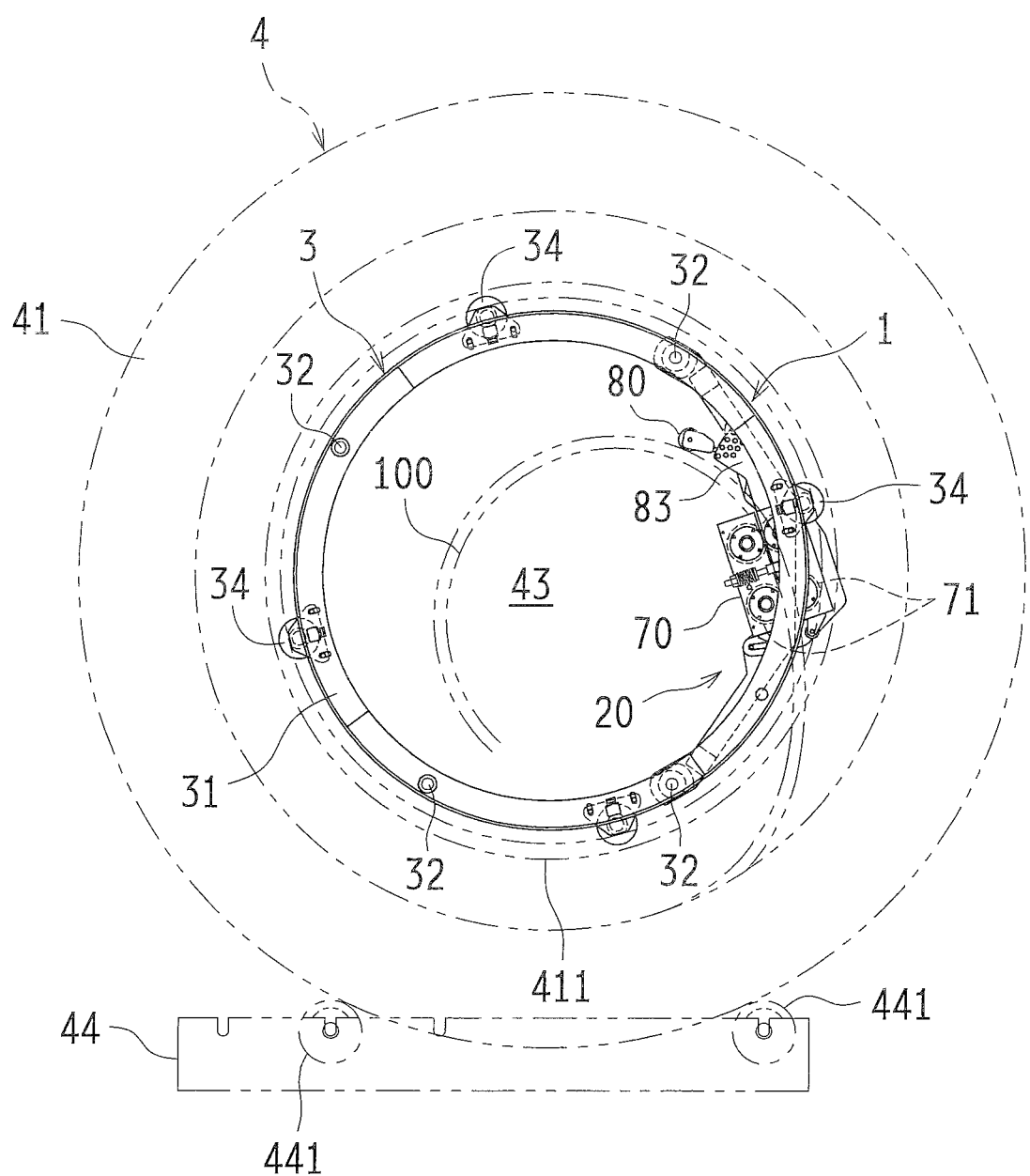
FIG. 14 is a front view illustrating the curl-forming apparatus and a holding unit.
Figure 15:
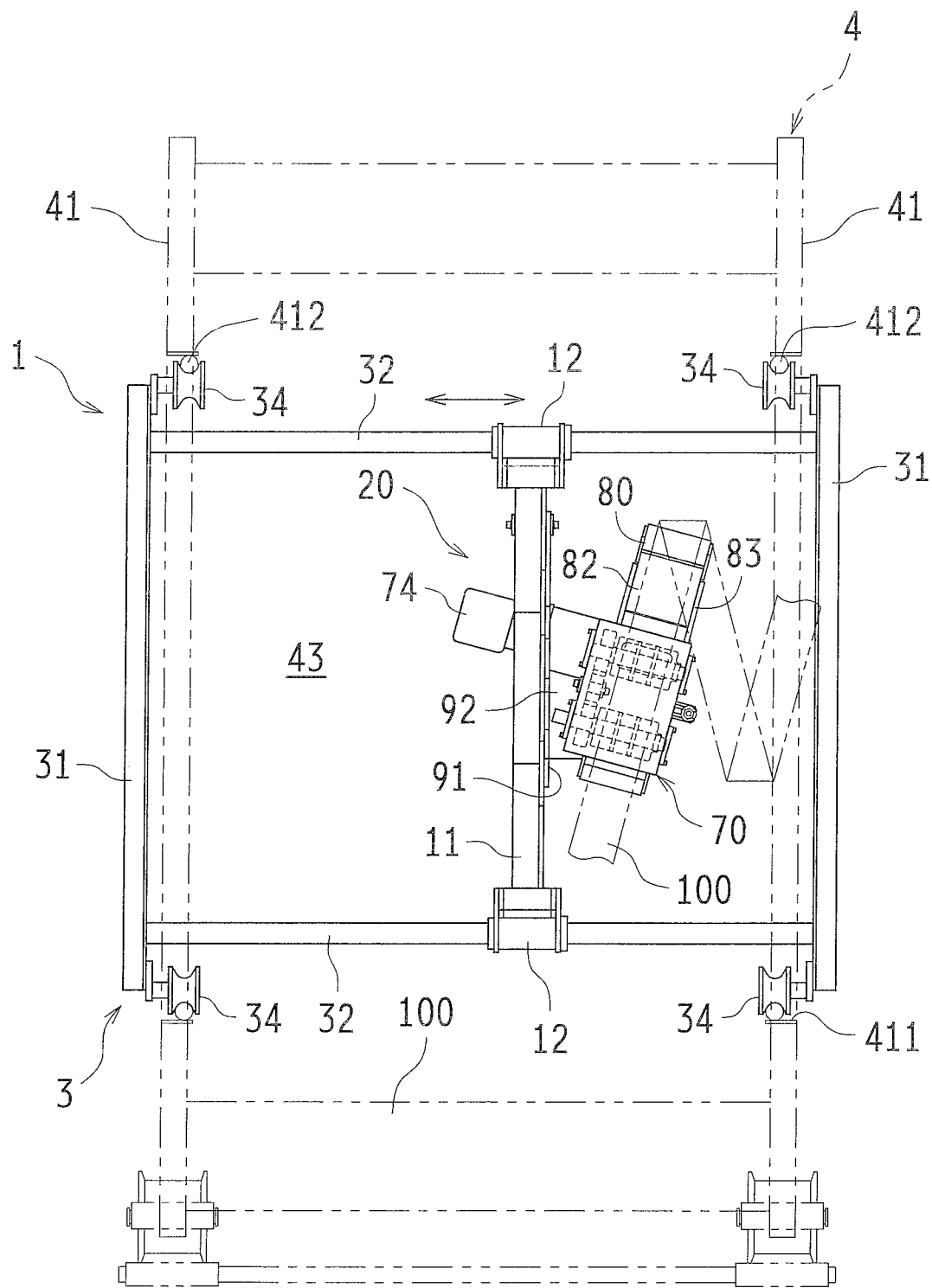
FIG. 15 is a side view of FIG. 14.

The curl-forming apparatus 1 according to Embodiment 2 includes: a main body 20 having a curl-forming unit; and the support body 3 that holds the main body 20 in the holding unit 4 of the profile strip 100. As shown in FIGS. 14 and 15, the main body 20 includes: a main body frame 11 that is disposed inside the hollow part 43 of the holding unit 4; and the curl-forming unit attached to a main body frame 11. Since the support body 3 and the holding unit 4 respectively have the same configurations as those in Embodiment 1, they are each represented by the same reference numeral and the detailed description thereof is omitted here.

Figure 12:
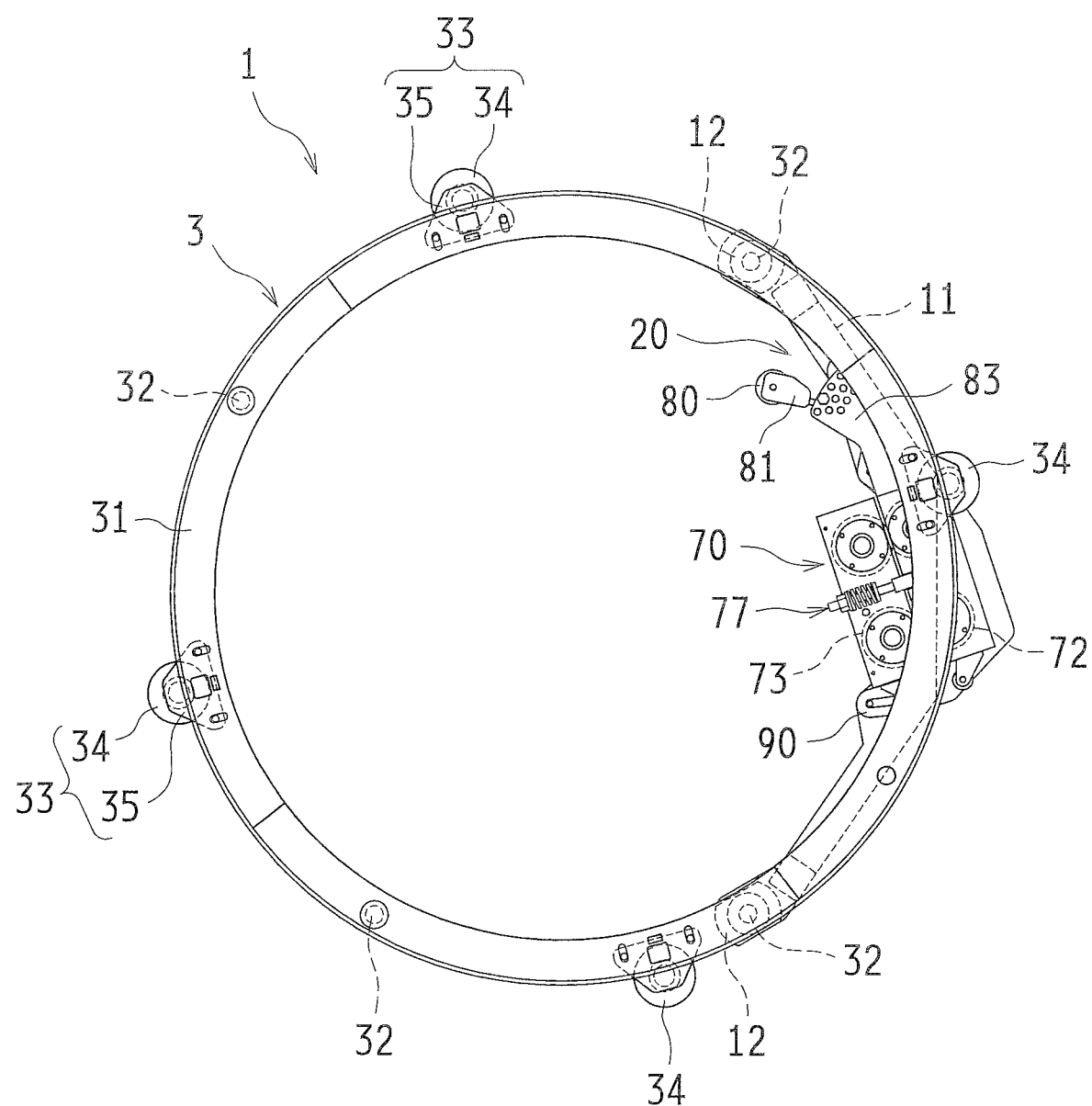
FIG. 12 is a front view illustrating a curl-forming apparatus according to Embodiment 2 of the present invention.
Figure 13:
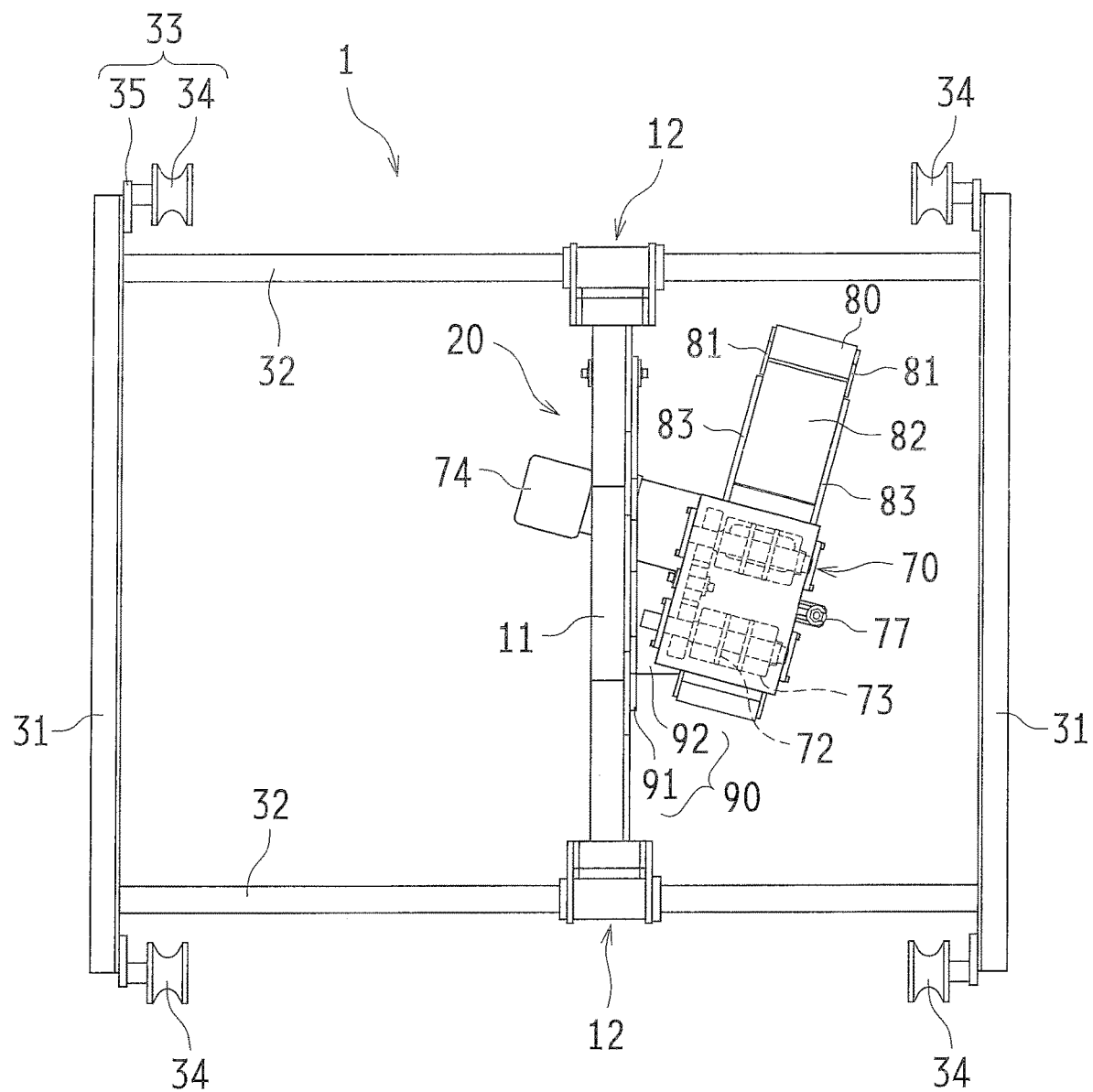
FIG. 13 is a side view illustrating the curl-forming apparatus according to Example 2 of the present invention.

As shown in FIGS. 12 and 13, the main body 20 includes the main body frame 11 that is bridged between the two guide bars 32. The main body frame 11 is made of a bar-like steel such as a square pipe having a high rigidity, and is formed in a bent-shape that is similar to the external form of the ring-shaped support frame 31.

Figure 16:
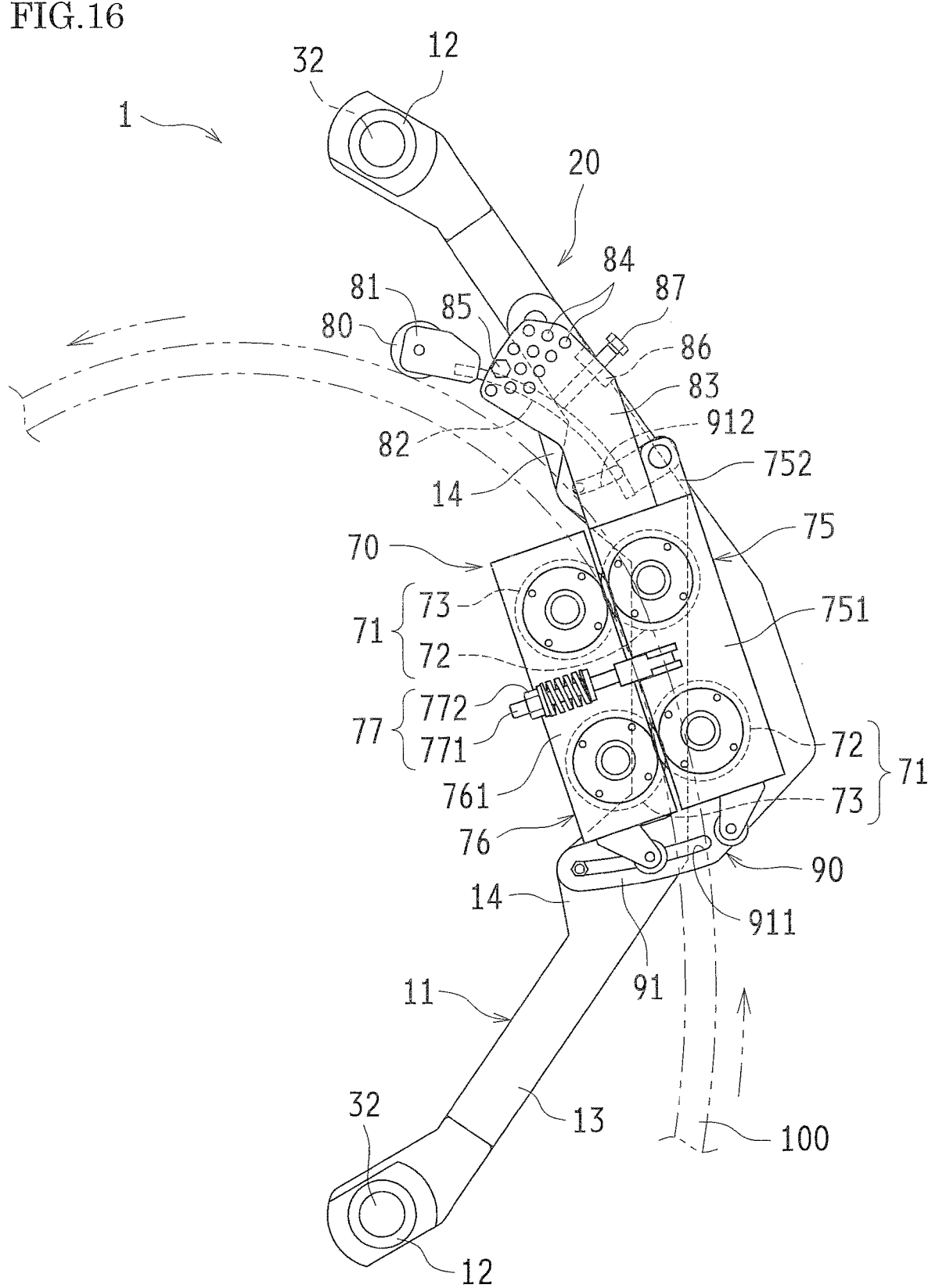
FIG. 16 is a front view illustrating a main body of the curl-forming apparatus according to Embodiment 2.

As shown in FIG. 16, the main body frame 11 has, at both ends thereof, two sliding parts 12 that are slidably attached to the respective guide bars 32. The sliding parts 12 each have a cylindrically penetrating hollow part through which the corresponding guide bar 32 is passed and held. The main body frame 11, which is connected to the two guide bars 32, is movable in the axial direction along the guide bars 32 of the support body 3.

Thus, the main body frame 11 is disposed between the pair of ring-shaped support frames 31. The main body 20 is supported by the two guide bars 32 and displaceable in the axial direction of the holding unit 4, thus, can reciprocate inside the hollow part 43 of the holding unit 4.

The main body 20 includes, as a curl-forming unit: a drive unit 70 that draws the profile strip 100 from the inner peripheral side of the holding unit 4 and discharges the profile strip 100; and a deforming roller 80 that transfers the profile strip 100 discharged from the drive unit 70 while pressing the profile strip 100 toward the inside in the radial direction so as to form curls in the profile strip 100.

The drive unit 70 includes two pairs of pinch rollers 71, each pair thereof is constituted by a pair of outer roller 72 and inner roller 73 that sandwiches the profile strip 100 from its front surface and rear surface and that is rotationally driven. As shown in FIG. 16, as the pinch roller 71, the outer roller 72 is disposed in the vicinity of the outer periphery, while the inner roller 73 is disposed in the inner peripheral side of the outer roller 72.

Figure 17:
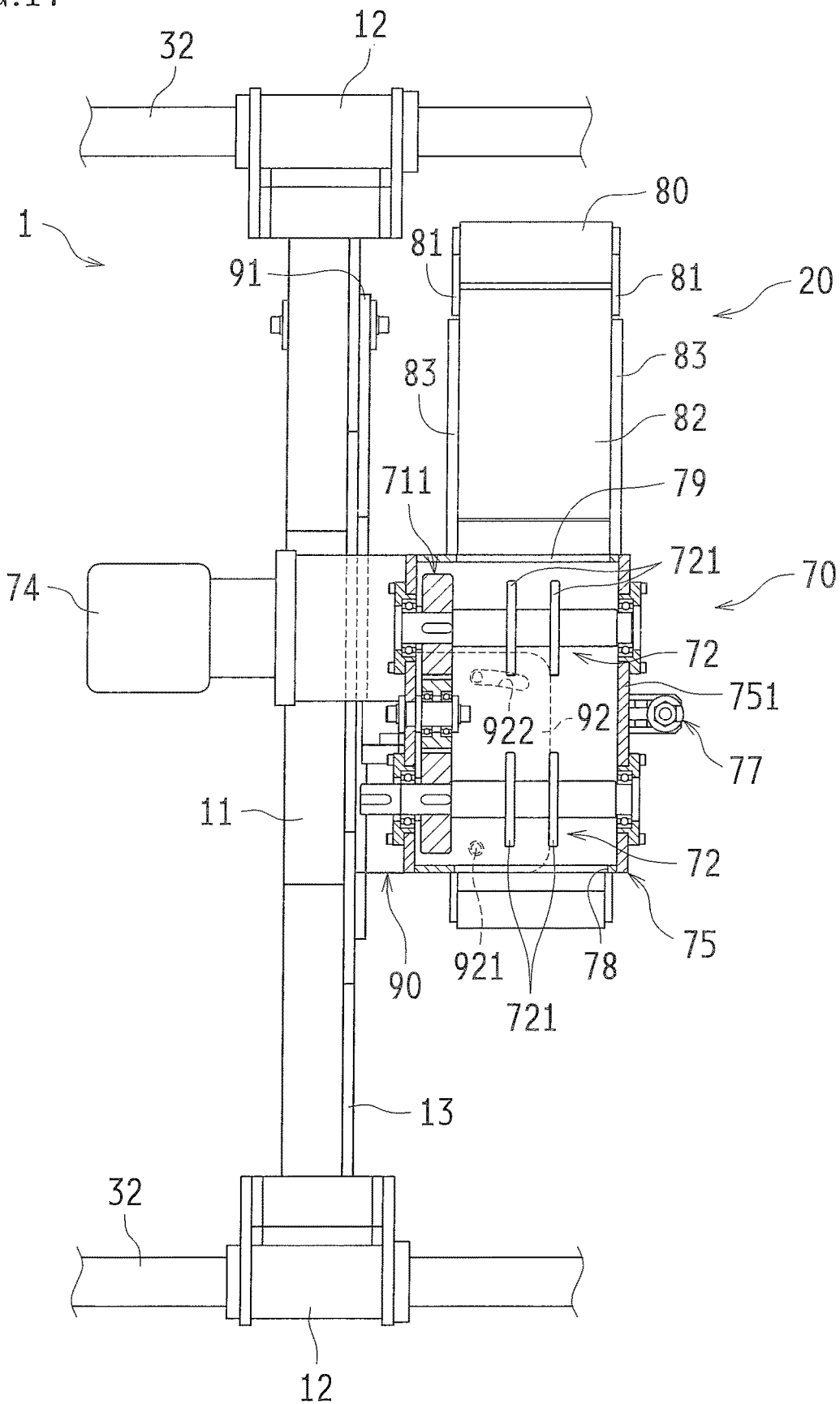
FIG. 17 is a side view illustrating the main body of FIG. 16.

As shown in FIG. 17, the drive unit 70 includes a drive motor 74 that rotationally drives the outer roller 72 or the inner roller 73. The outer roller 72 and the inner roller 73 rotate in opposite directions to each other via a speed reducer (for example, gears of a gear mechanism 711). The drive force of the drive motor 74 is transmitted to the respective rotary shafts of the rollers via the gear mechanism 711, thus the rotational speed of the outer roller 72 and the inner roller 73 are appropriately reduced.

The inner roller 73 is a cylinder body made of a metal or a synthetic resin, while the outer roller 72 includes flange parts 721. The flange parts 721 are flanges to engage with the reinforcing material 120 of the profile strip 100. Each outer peripheral surface of the flange parts 721 are knurled so as to make contact with the outer surface side of the profile strip 100 (for example, each groove portion of the reinforcing material 120) and to rotate without slipping. The rollers 72 and 73 are each formed so as to have a length in the axial direction greater than the length corresponding to the width of the profile strip 100.

The drive unit 70 is formed by combining an outer unit 75 that holds the two outer rollers 72 in its inside and an inner unit 76 that holds the two inner rollers 73 in its inside. As shown in FIGS. 16 and 17, in the outer unit 75, the respective rotary shafts of the outer rollers 72 are rotatably supported by a casing 751 having a rigidity via respective bearings. Parts of the gears of the gear mechanism 711 are housed in the outer unit 75 so as to be fixed to the respective rotary shafts of the outer rollers 72.

In the inner unit 76, the respective rotary shafts of the inner rollers 73 are rotatably supported by a casing 761 having a rigidity via respective bearings. Similarly to the outer unit 75, parts of the gears of the gear mechanism 711 are housed in the inner unit 76 so as to be fixed to the respective rotary shafts of the inner rollers 73. These gears are meshed with each other to constitute the gear mechanism 711, so that the outer roller 72 and the inner roller 73 are synchronously rotated.

These two pairs of pinch rollers 71 that are provided in the drive unit 70 can be pressed against/separated from the profile strip 100. For example, the drive unit 70 can open/close the pinch rollers 71 between the pressed position and the separated position relative to the profile strip 100. The inner unit 76 can be opened/closed relative to the outer unit 75 via, for example, a hinge shaft (not shown) on the back side thereof. The gear mechanism 711 is engaged with/separated from each other inside the drive unit 70 in response to the opening/closing operation of the outer unit 75 and the inner unit 76.

On the front surface of the drive unit 70, a closing member 77 is disposed to maintain the closed state of the outer unit 75 and the inner unit 76. As shown in FIG. 16, a coupling bolt 771 is provided as the closing member 77, to which a coil spring and a retaining ring are attached. An end of the coupling bolt 771 is pivotably attached to the front surface of the outer unit 75, while a nut 772 is screwed with the other end of the coupling bolt 771 to press the coil spring so that it is compressed. On the inner unit 76, a receiving part of the coupling bolt 771 is projected. The shaft of the coupling bolt 771 is inserted through the receiving part and the nut 772 is tightened. Thus, the axial biasing force is given so as to close and fix the units 75 and 76.

As shown in FIG. 17, the outer unit 75 is provided with: a lead-in port 78 to draw the profile strip 100 into the pinch rollers 71 disposed inside; and a lead-out port 79 to discharge the profile strip 100, by respectively cutting out the side surface of the casing 751 so as to have a concave shape. When the outer unit 75 and the inner unit 76 are combined and closed, the lead-in port 78 and the lead-out port 79 form respective openings that are larger than the width of the profile strip 100.

Thus, the drive unit 70 can be opened/closed appropriately, which makes easy to provide the profile strip 100 between the pinch rollers 71 or to remove the profile strip 100 from the pinch rollers 71. Since the two pairs of the pinch rollers 71 are collected in the single drive unit 70, the main body 20 can be downsized to be easily installed inside the holding unit 4. In FIG. 16, the profile strip 100 is introduced from the right side of the drawing that is the upstream side of the drive unit 70 to the inside of the drive unit 70, sandwiched between the pinch rollers 71 and sequentially transported, and discharged to the left side of the drawing that is the downstream side of the drive unit 70.

The drive unit 70 is attached to the main body frame 11 via an attachment bracket 90. The other guide bars 32, to which the main body frame 11 is not attached, are weighted so as to face the drive unit 70, thus the weight balance is maintained relative to the drive unit 70. The main body frame 11 is formed integrally attaching, on the front surface thereof, a plate member 13 having attachment pieces 14 to the attachment bracket 90. The plate member 13 has two extended portions as the attachment pieces 14 from the main body frame 11.

The attachment bracket 90 integrally includes a first attachment plate 91 to be attached to the front surface of the main body frame 11, and a second attachment plate 92 disposed in the direction perpendicular to the first attachment plate 91.

As shown in FIG. 16, the first attachment plate 91 is a plate-like member having a flat-plate shape. The first attachment plate 91 includes long holes 911 and 912 respectively corresponding to the attachment pieces 14 located upstream/downstream of the drive unit 70. The upstream long hole 911 is formed to have a shape longer than the downstream long hole 912. These long holes 911 and 912 are respectively circular-arc shaped through holes.

As shown in FIG. 17, the second attachment plate 92 is a plate-like member provided so as to extend in the front surface direction of the first attachment plate 91. The second attachment plate 92 includes: a fixing hole 921 to fix the drive unit 70; and a long hole 922. The fixing hole 921 is provided so as to penetrate the second attachment plate 92 at a position corresponding to the upstream side of the drive unit 70, while the long hole 922 is formed so as to have a circular-arc shape and to penetrate the second attachment plate 92 at a position corresponding to the downstream side of the drive unit 70.

The second attachment plate 92 is attached to the casing 751 of the outer unit 75 of the drive unit 70 via the fixing hole 921 and the long hole 922, with bolts and nuts. The second attachment plate 92 allows to change the attachment position of the drive unit 70 within the range of the length of the long hole 922. For example, it is possible to change the orientation of the pinch rollers 71 of the drive unit 70 by moving the drive unit 70 in the front surface direction along the long hole 922 about the fixing hole 921. Thus, since the orientation of the pinch rollers 71 can be changed, it is possible to appropriately adjust the direction in which the profile strip 100 is drawn into the drive unit 70.

The first attachment plate 91 is disposed between the main body frame 11 and the drive unit 70, and fastened to each attachment piece 14 via the long holes 911 and 912 with bolts and nuts. Since the first attachment plate 91 has the long holes 911 and 912, it is possible to change the respective bolt positions within the respective ranges of the lengths of the long holes 911 and 912.

Figure 18:
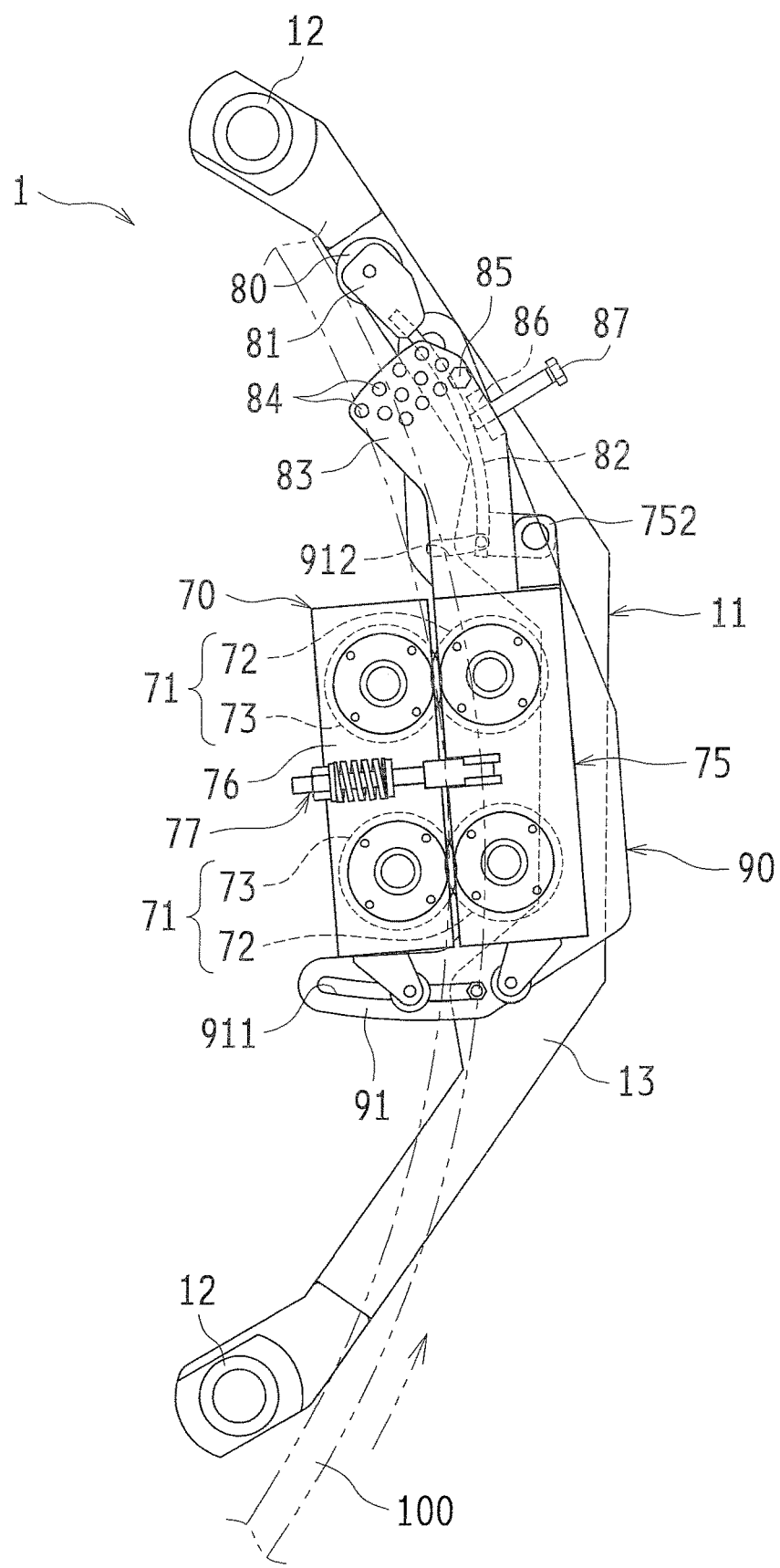
FIG. 18 is a front view illustrating one example of the shifted main body of the curl-forming apparatus according to Embodiment 2.

Thus, it is possible to change the attachment position of the drive unit 70 to the main body frame 11 by moving the bolt positions within the respective ranges of the lengths of the long holes 911 and 912 of the first attachment plate 91 so as to change the fastening position of the first attachment plate 91 and the attachment pieces 14. Also, it is possible to adjust the attachment position of the drive unit 70 by sliding one bolt with the other bolt being as a fulcrum. Like this, it is easily change the attachment position of the drive unit 70 from, for example, the position shown in FIG. 16 to the position shown in FIG. 18. Thus, the attachment position of the drive unit 70 to the main body frame 11 is adjustable in the inner/outer direction of the center hollow part of the holding unit 4.

The drive unit 70 may also be swingable relative to the second attachment plate 92 of the attachment bracket 90 by a slide pin that fastens the second attachment plate 92 to the drive unit 70 and that is regulated along the long hole 922. With such a configuration, the drive unit 70 is swingable following the profile strip 100 to be drawn so that the respective rotary shafts of the two pairs of pinch rollers 71 are substantially perpendicular to the axial direction of the profile strip 100.

The deforming roller 80 as a curl-forming unit transfers the profile strip 100 discharged from the drive unit 70 while pressing the profile strip 100 toward the inside in the radial direction so as to form curls in the profile strip 100. As shown in FIGS. 12 and 13, the deforming roller 80 is, for example, a columnar-shaped roller that is disposed downstream of the drive unit 70. The deforming roller 80 is rotatable with its rotary shaft being supported by a roller support part 81, and freely rotates while making contact with the outer peripheral surface of the profile strip 100. In the aspect exemplarily shown, the roller support part 81 is integrally formed at a tip part of a coupling plate 82 disposed downstream of the drive unit 70.

As shown in FIG. 16, the coupling plate 82 is a short strip plate formed so as to have a curved surface along the discharge direction of the profile strip 100. A base end part of the coupling plate 82 is pivotably supported by a support member 752 that protrudes in the vicinity of the lead-out port 79 of the drive unit 70. The tip part of the coupling plate 82 is connected to the roller support part 81 downstream of the drive unit 70 so as to support the deforming roller 80 via the roller support part 81.

A multistage adjusting member 83 is disposed on both sides in the width direction of the coupling plate 82. The multistage adjusting member 83 is two plate-like members disposed respectively on both sides in the width direction of the coupling plate 82 at their mutual interval corresponding to the length of the deforming roller 80 in the shaft direction. The multistage adjusting member 83 is joined to the outer surfaces of the drive unit 70, and extends toward the downstream side in the discharge direction of the profile strip 100.

In the aspect exemplarily shown, the multistage adjusting member 83 has a size and shape according to the range of the pivoting angle of the coupling plate 82 that pivots about the base end part. The multistage adjusting member 83 includes multiple through holes 84 provided at constant intervals in the vicinity of the tip part of the coupling plate 82. A bolt 85, which is disposed on the outer surface of the coupling plate 82 in the width direction to support the coupling plate 82, is selectively inserted through any of the through holes 84 of the multistage adjusting member 83.

That is, the bolt 85 is inserted through any of the through holes 84 of the multistage adjusting member 83 and fastened, thus the outer surface of the coupling plate 82 is supported by the bolt shaft. For example, in the aspect shown in FIG. 16, out of the multiple through holes 84 of the multistage adjusting member 83, the bolt 85 is inserted through the through hole 84 in the inner side in the radial direction so as to support the tip part of the pivotable coupling plate 82. On the other hand, in the aspect shown in FIG. 18, the bolt 85 is inserted through the through hole 84 in the outer side in the radial direction of the multistage adjusting member 83 so as to support the tip part of the coupling plate 82.

Since the coupling plate 82 is pivotably disposed downstream of the drive unit 70, its disposing direction relative to the drive unit 70 can be changed. For this reason, it is possible to change the position of the rotary shaft of the deforming roller 80 of the tip part of the coupling plate 82 from the outer side of the hollow part 43 of the holding unit 4 to the inner side thereof. Since the position of the rotary shaft of the deforming roller 80 is changed, it is possible to change the bending shape of the profile strip 100 discharged from the drive unit 70. Thus, by adjusting the disposing direction of the coupling plate 82, it is possible to easily change the helical diameter of the curls to be formed in the profile strip 100.

On the outer surface side of the coupling plate 82, an angle adjusting bolt 87 is disposed to press the coupling plate 82 from the outer side. A bolt shaft of the angle adjusting bolt 87 is screwed with a coupling member 86 that is bridged in the width direction of the multistage adjusting member 83. The tip part of the bolt shaft can be displaced in the shaft direction by tightening/loosening the angle adjusting bolt 87. When tightening the angle adjusting bolt 87, the outer surface of the coupling plate 82 is pressed, thus the disposing direction of the coupling plate 82 can be finely adjusted. For example, when it is desired to further adjust the helical diameter of the curls of the profile strip 100 by the range of from several millimeters to several tens of millimeters after fixing the coupling plate 82 with the multistage adjusting member 83, it is possible to adjust the position of the coupling plate 82 depending on the tightening degree of the angle adjusting bolt 87.

Figure 20:
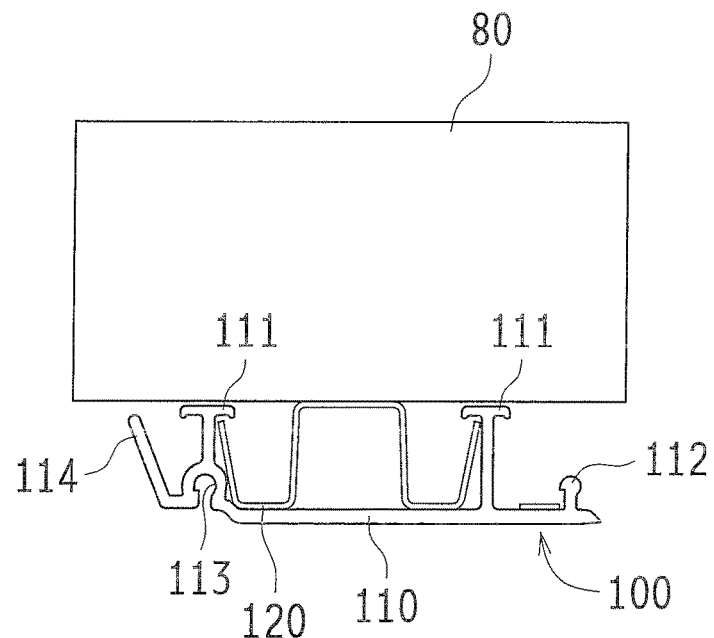
FIG. 20 is an explanation diagram illustrating one example of a deforming roller of the curl-forming apparatus according to Embodiment 2.

As described above, on the profile strip 100, the reinforcing material 120 is attached between the ribs 111. Meanwhile, as shown in FIG. 20, the deforming roller 80 has a cylindrical outer peripheral surface, and is formed so as to have a length in the shaft direction corresponding to the width of the profile strip 100. In the profile strip 100, the tip parts of the ribs 111 make contact with the outer peripheral surface of the deforming roller 80, and the convex part of the reinforcing material 120 also makes contact with the outer peripheral surface of the deforming roller 80. Thus, it is possible to transfer the profile strip 100 discharged from the drive unit 70 while pressing the profile strip 100 toward the inside in the radial direction so as to form helical curls in the profile strip 100.

Figure 21:
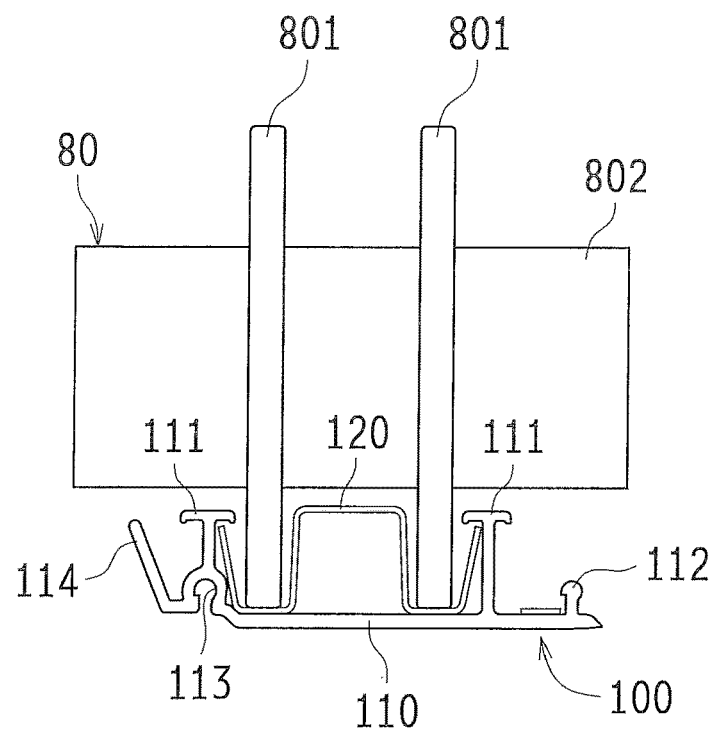
FIG. 21 is an explanation diagram illustrating another example of the deforming roller.

As shown in FIG. 21, the deforming roller 80 may be a roller including flange-shaped large-diameter parts 801 and a cylinder-shaped small-diameter part 802. In this case, the large-diameter parts 801 of the deforming roller 80 engage with the concave parts of the reinforcing material 120 and rotate, thus helically deforming and transferring the profile strip 100. Since the large-diameter parts 801 position the reinforcing material 120, they prevent the reinforcing material 120 from misaligning in the width direction of the profile strip 100, and regulate the discharge direction of the profile strip 100 in a certain direction.

Figure 22:
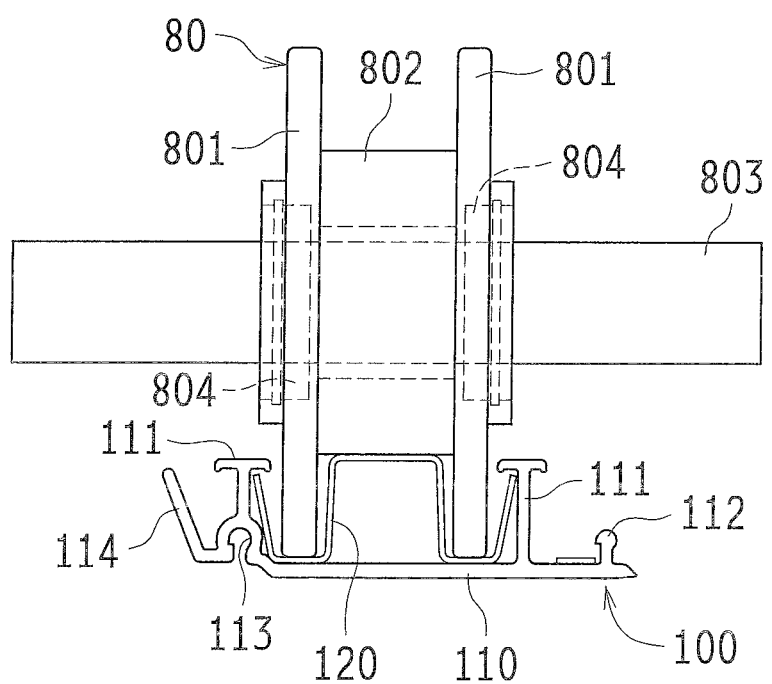
FIG. 22 is an explanation diagram further illustrating another example of the deforming roller.

As shown in FIG. 22, the deforming roller 80 may be slidably disposed in the axial direction along its rotary shaft. In this case, the deforming roller 80 includes the flange-shaped large-diameter parts 801 that engage with the reinforcing material 120 and the cylinder-shaped small-diameter part 802, and furthermore covers a rotary shaft 803 via a bearing 804. Thus, the deforming roller 80 reliably makes contact with the profile strip 100 and rotates so as to form curls in the profile strip 100 while allowing the misalignment of the profile strip 100 in the width direction. Therefore, no excessive force is applied to the profile strip 100, and it is possible to prevent the profile strip 100 from being twisted or damaged.

The curl-forming apparatus 1 according to Embodiment 2 can also be used with being installed in the holding unit 4, similarly to Embodiment 1. That is, as shown in FIGS. 14 and 15, the support body 3 of the curl-forming apparatus 1 is attached to the holding unit 4, thus the main body 20 is disposed in the hollow part 43 of the holding unit 4. The profile strip 100 is drawn from the inner peripheral side of the holding unit 4 and is passed through the drive unit 70. By driving the drive motor 74, the pinch rollers 71 are driven and rotated so as to draw the profile strip 100 and discharge it to the coupling plate 82. The coupling plate 82 guides the tip part of the profile strip 100 to the deforming roller 80.

The profile strip 100 is sequentially drawn into the drive unit 70 with its position to be drawn reciprocally displacing in the axial direction of the hollow part 43 of the holding unit 4. Meanwhile, the main body 20 of the curl-forming apparatus 1 displaces in the axial direction in the hollow part 43 of the holding unit 4, and draws the profile strip 100 at the appropriate position. Since no excessive force is applied to the profile strip 100 that is drawn into the curl-forming apparatus 1, the profile strip 100 can be smoothly introduced to the main body 20 so as to be subjected to deformation to have helical curls by the deforming roller 80.

With the curl-forming apparatus 1 according to Embodiment 2, it is possible to adjust the disposing position of the deforming roller 80 relative to the drive unit 70. Thus, the position of the deforming roller 80 can be changed according to the helical diameter to be given to the profile strip 100. As a result, it is possible to deform, using a single apparatus, the profile strip 100 to have curls with various helical diameters.

The main body 20 is reciprocating in the axial direction inside the hollow part 43 of the holding unit 4 when it draws the profile strip 100. Following the position of the profile strip 100 held in the holding unit 4, the main body 20 moves in the axial direction along the guide bars 32. Furthermore, when the release position of the profile strip 100 is reciprocated in the axial direction, the main body 20 also reciprocates in response to the movement of the profile strip 100 to draw the profile strip 100. Thus, the profile strip 100 can continuously be drawn into the main body 20.

Figure 19:
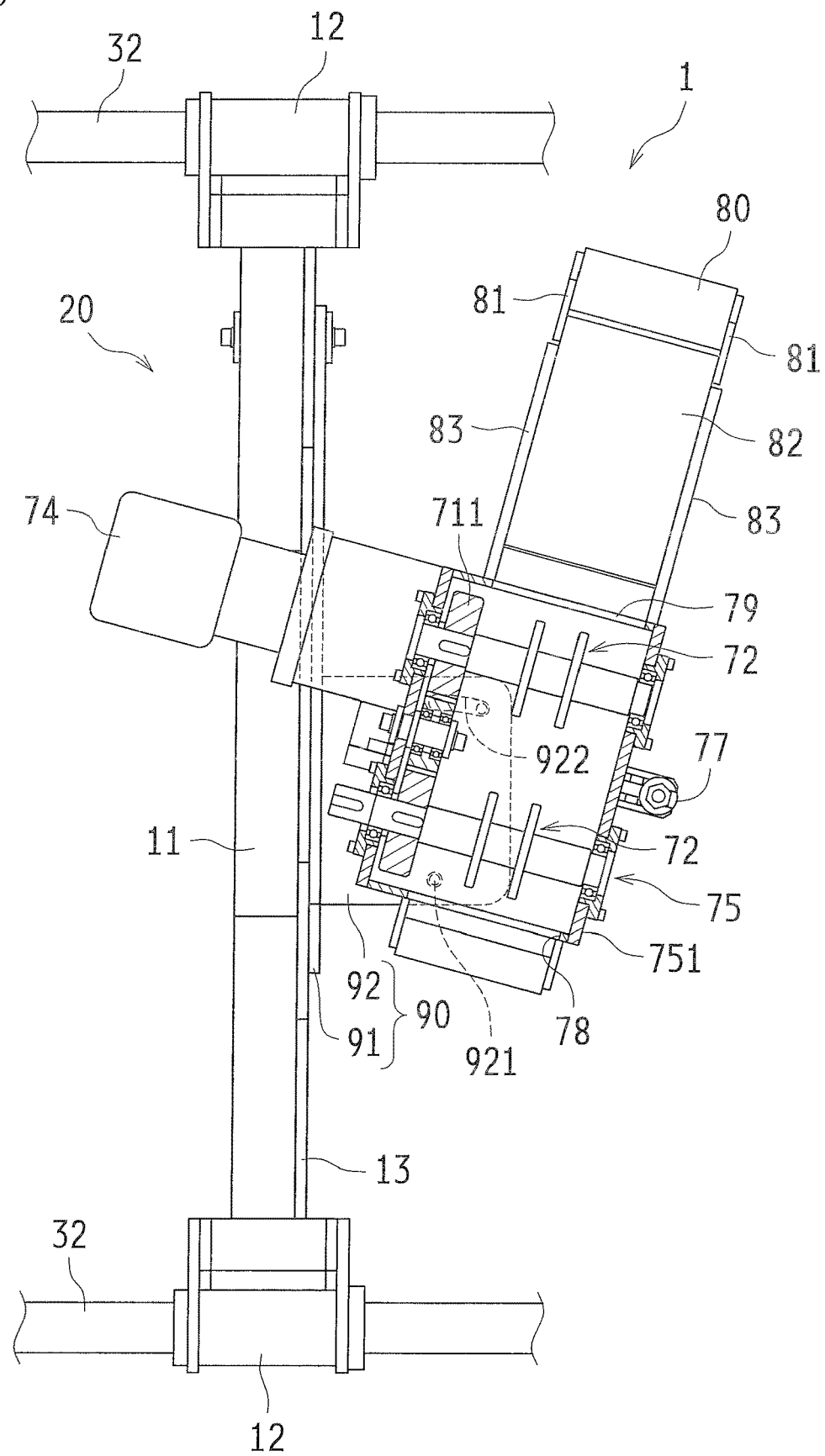
FIG. 19 is a side view illustrating the main body of FIG. 18.

In the construction process, the amount of the profile strip 100 that is wound and housed in the holding unit 4 decreases. As a result, when the profile strip 100 is drawn into the curl-forming apparatus 1, the profile strip 100 may have looseness or slack, or its angle of approach to the pinch roller 71 may also be changed. In such cases, it is possible to adjust the rotary shafts of the two pairs of pinch rollers 71 to be substantially perpendicular to the axial direction of the profile strip 100 by changing the disposition of the drive unit 70 following the profile strip 100 to be drawn. That is, the disposition of the drive unit 70 as shown in FIG. 17 can be changed, freely, to the disposition of the drive unit 70 shown in FIG. 19 by changing the attachment position to the attachment bracket 90. Thus, it is possible to continuously draw the profile strip 100 smoothly from the inner peripheral side of the holding unit 4 and to introduce the profile strip 100 into the drive unit 70 of the main body 20, which results in stable formation of the helical curls.

The profile strip 100, which has desired helical curls after being subjected to the deformation by the deforming roller 80, is introduced into the departure side manhole 61 from the holding unit 4. Then, it is formed in the shape of a pipe by the winding machine 5 inside the existing pipe 6.

In the curl-forming apparatus 1 according to the present invention, the curl-forming unit provided in the main body 20 is not limited to the above-described configuration. It may have any configuration provided that it includes specific means to form helical curls in the profile strip 100. The holding unit 4 is not limited to the rotary drum as exemplarily shown. It may have any configuration provided that it is configured to release/discharge the profile strip 100 smoothly while holding the profile strip 100.

Figure 23:
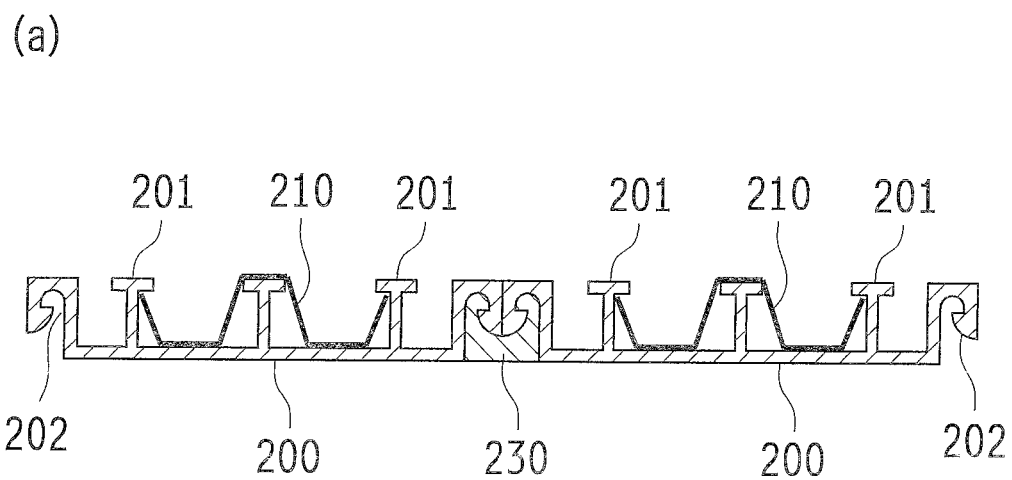
FIGS. 23(a) and 23(b) are diagrams illustrating another example of the reinforcing material-attached profile strip.
Figure 23:
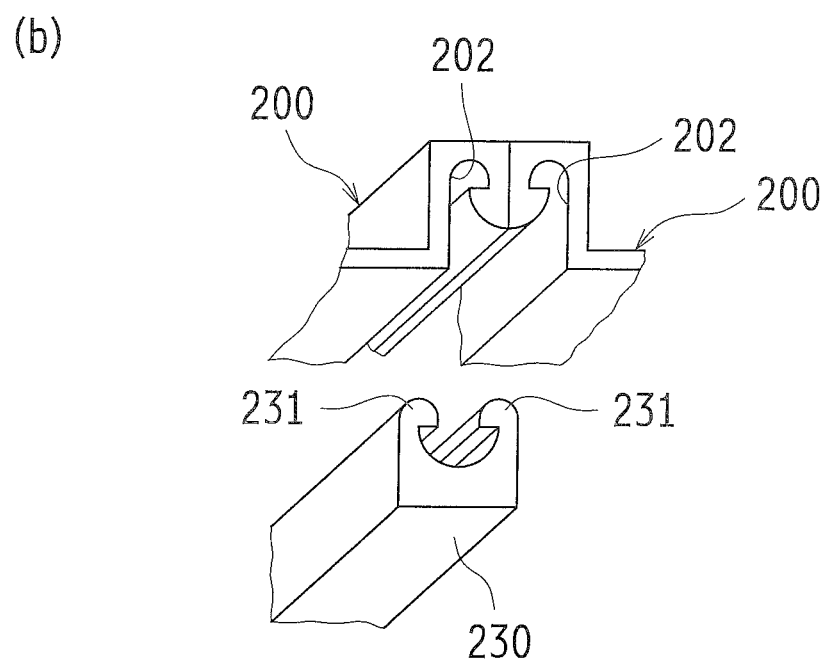

Also, the profile strip 100, to which the reinforcing material 120 is attached, is not limited to that as exemplarily shown. It may have any other configuration that includes, for example, the side edges, the ribs, and the reinforcing material whose shapes are different from those as exemplarily shown. For example, as shown in FIG. 23(*a*), a profile strip 200 may be joined using a connector 230. In this case, the profile strip 200 has a reinforcing material 210 between ribs 201, and a joint concave part 202 is formed on each side edge the profile strip 200. As shown in FIG. 23(*b*), the connector 230 includes a pair of joint convex parts 231 that can be fitted to the respective joint concave parts 202 and 202 of the adjacent turns of the profile strip 200 so as to join the joint concave parts 202 and 202. With such a profile strip 200 also, it is possible to form accurately the rehabilitating pipe 130 with a high strength by forming helical curls continuously by the curl-forming apparatus 1.

The present invention may be embodied in other forms without departing from the gist or essential characteristics thereof. The foregoing embodiments are therefore to be considered in all respects as illustrative and not limiting. The scope of the invention is indicated by the appended claims rather than by the foregoing description, and all modifications and changes that come within the meaning and range of equivalency of the claims are intended to be embraced therein. This application claims priority based on Japanese Patent Application No. 2014-116215. The entire contents thereof are hereby incorporated in this application by reference.

INDUSTRIAL APPLICABILITY

The present invention can be suitably applied to a method for rehabilitating deteriorated existing pipes such as a sewage pipe, a water supply pipe, an agricultural water pipe and a gas pipe, using a reinforcing material-attached profile strip.

DESCRIPTION OF REFERENCE NUMERALS

1 Curl-forming apparatus
2, 20 Main body
11, 21 Main body frame
22 Main body holding part
26 Drive motor
3 Support body
31 Support frame
32 Guide bar
33 Bearing unit
34 Roller
4 Holding unit
41 Flange frame
411 Circular opening
412 Rail body 42 Coupling member
43 Hollow part
5 Winding machine
6 Existing pipe
70 Drive unit
80 Deforming roller
82 Coupling plate
90 Attachment bracket
100 Profile strip
110 Profile strip body
120 Reinforcing material
130 Rehabilitating

The invention claimed is:

1. A curl-forming apparatus configured to deform a profile strip for rehabilitating a pipe line so that the profile strip has helical curls, and to supply the deformed profile strip to a winding machine, the curl-forming apparatus comprising:
 a main body configured to deform the profile strip drawn from a holding unit having a hollow part in an axial direction thereof and to discharge the deformed profile strip; and
 a support body configured to support the main body,
 wherein the main body deforms the profile strip so that the profile strip has helical curls and furthermore discharges the deformed profile strip without producing a rehabilitating pipe,
 wherein the support body includes bearing units to be engaged with the holding unit on which the profile strip before being produced as the rehabilitating pipe is wound so that the support body is rotatably attached to the holding unit when the curl-forming apparatus is arranged within the hollow part of the holding unit, and
 wherein the support body is configured to rotate relative to the holding unit within the hollow part of the holding unit in synchronization with the main body that draws the profile strip from the holding unit.

2. The curl-forming apparatus according to claim 1,
 wherein the holding unit includes: a pair of rotary frames each having a circular opening; and a plurality of coupling members disposed between the rotary frames so as to couple the rotary frames to each other, and
 wherein the bearing units include support rollers that are each engaged with a corresponding edge part of the circular opening of the rotary frame.

3. The curl-forming apparatus according to claim 2,
 wherein the main body is supported so as to be displacable in an axial direction of the plurality of coupling members of the holding unit.

4. The curl-forming apparatus according to claim 1,
 wherein the support body includes a plurality of guide bars parallel to each other, and
 wherein the main body is configured to reciprocate along the guide bars in the axial direction of the holding unit.

5. The curl-forming apparatus according to claim 1,
 wherein the main body includes: a drive unit configured to draw the profile strip from the holding unit so as to discharge the profile strip; and a deforming roller configured to form curls in the profile strip discharged from the drive unit.

6. The curl-forming apparatus according to claim 5,
 wherein a disposing position of the deforming roller is adjustable relative to the drive unit.

7. The curl-forming apparatus according to claim 5,
 wherein a curved plate is disposed downstream of the drive unit so as to guide the profile strip to the deforming roller, and
 wherein the profile strip is deformed on a path from the drive unit to the deforming roller.

8. The curl-forming apparatus according to claim 6,
 wherein a curved plate is disposed downstream of the drive unit so as to guide the profile strip to the deforming roller, and
 wherein the profile strip is deformed on a path from the drive unit to the deforming roller.

* * * * *